(12) United States Patent
Malicki

(10) Patent No.: US 12,459,667 B2
(45) Date of Patent: *Nov. 4, 2025

(54) SYSTEM FOR TRANSPORTING AIRPLANES ON AN AIRPORT APRON

(71) Applicant: Slawomir Malicki, Gora Kalwaria (PL)

(72) Inventor: Slawomir Malicki, Gora Kalwaria (PL)

( * ) Notice: Subject to any disclaimer, the term of this patent is extended or adjusted under 35 U.S.C. 154(b) by 865 days.

This patent is subject to a terminal disclaimer.

(21) Appl. No.: 17/707,452

(22) Filed: Mar. 29, 2022

(65) Prior Publication Data

US 2022/0219835 A1 Jul. 14, 2022

Related U.S. Application Data

(63) Continuation-in-part of application No. 16/674,518, filed on Nov. 5, 2019, now Pat. No. 11,299,291, which is a continuation of application No. 15/351,524, filed on Nov. 15, 2016, now Pat. No. 10,486,829.

(30) Foreign Application Priority Data

Nov. 16, 2015 (PL) .......................................... 414811

(51) Int. Cl.
- *B64F 1/00* (2024.01)
- *B64F 1/227* (2024.01)
- *B64F 1/228* (2024.01)
- *B64F 1/26* (2006.01)

(52) U.S. Cl.
CPC .............. *B64F 1/002* (2013.01); *B64F 1/227* (2013.01); *B64F 1/228* (2013.01); *B64F 1/26* (2013.01)

(58) Field of Classification Search
CPC .. B64F 1/002; B64F 1/22; B64F 1/227; B64F 1/228; B64F 1/26; B61B 5/025; B60M 1/34
See application file for complete search history.

(56) References Cited

U.S. PATENT DOCUMENTS

| 3,162,404 | A | 12/1964 | Squire |
| 9,248,919 | B2 | 2/2016 | Malicki |
| 10,486,829 | B2 * | 11/2019 | Malicki .................... B64F 1/26 |

* cited by examiner

*Primary Examiner* — Robert J McCarry, Jr.
(74) *Attorney, Agent, or Firm* — Ralph E. Jocke; WALKER & JOCKE

(57) ABSTRACT

The exemplary arrangements provide a system of selectively moving airplanes on an airport apron. Airplanes are selectively moved from selected parking locations to areas adjacent to take-off locations such as runways. Airplanes may also be selectively moved from an area of the apron adjacent to a landing location to a parking location. This may include for example an unloading location, an airport terminal, a servicing location, a fueling location, storage location and/or other suitable location. The exemplary systems include driving channels through which a carriage is selectively moved. The carriage is in operative connection with a basket for operatively engaging at least one front wheel of selected airplanes for purposes of transporting such airplanes to and between the desired locations.

24 Claims, 23 Drawing Sheets

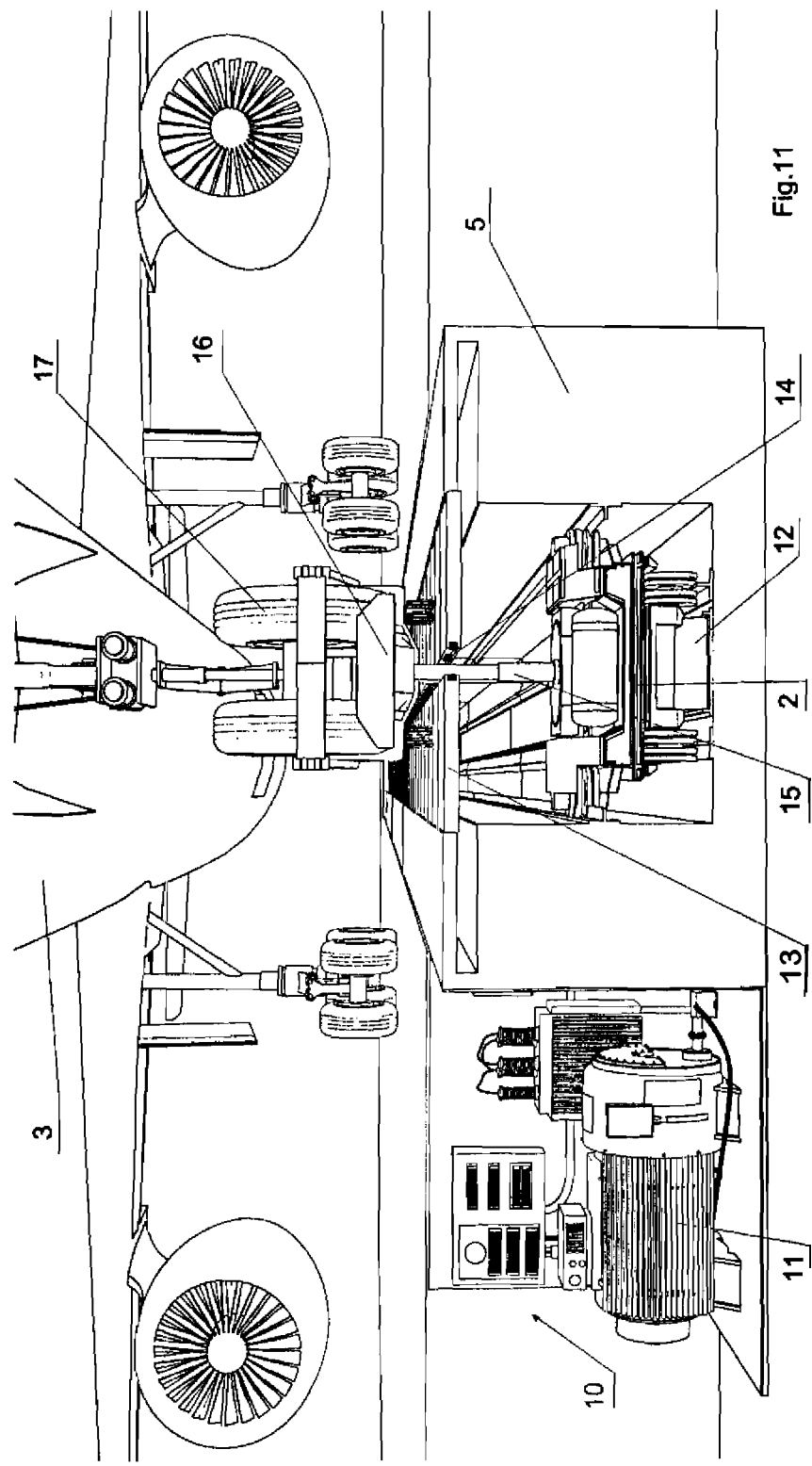

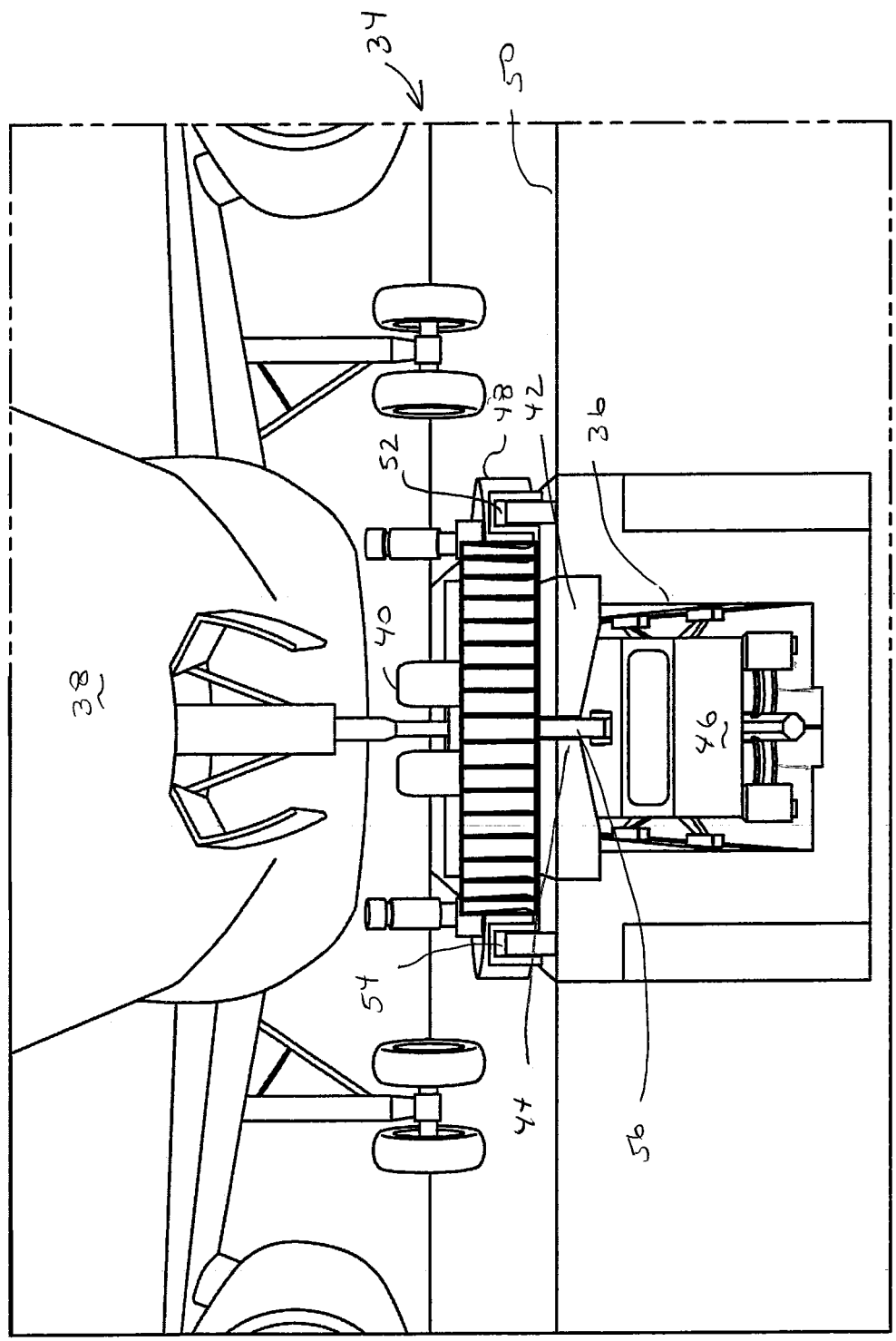

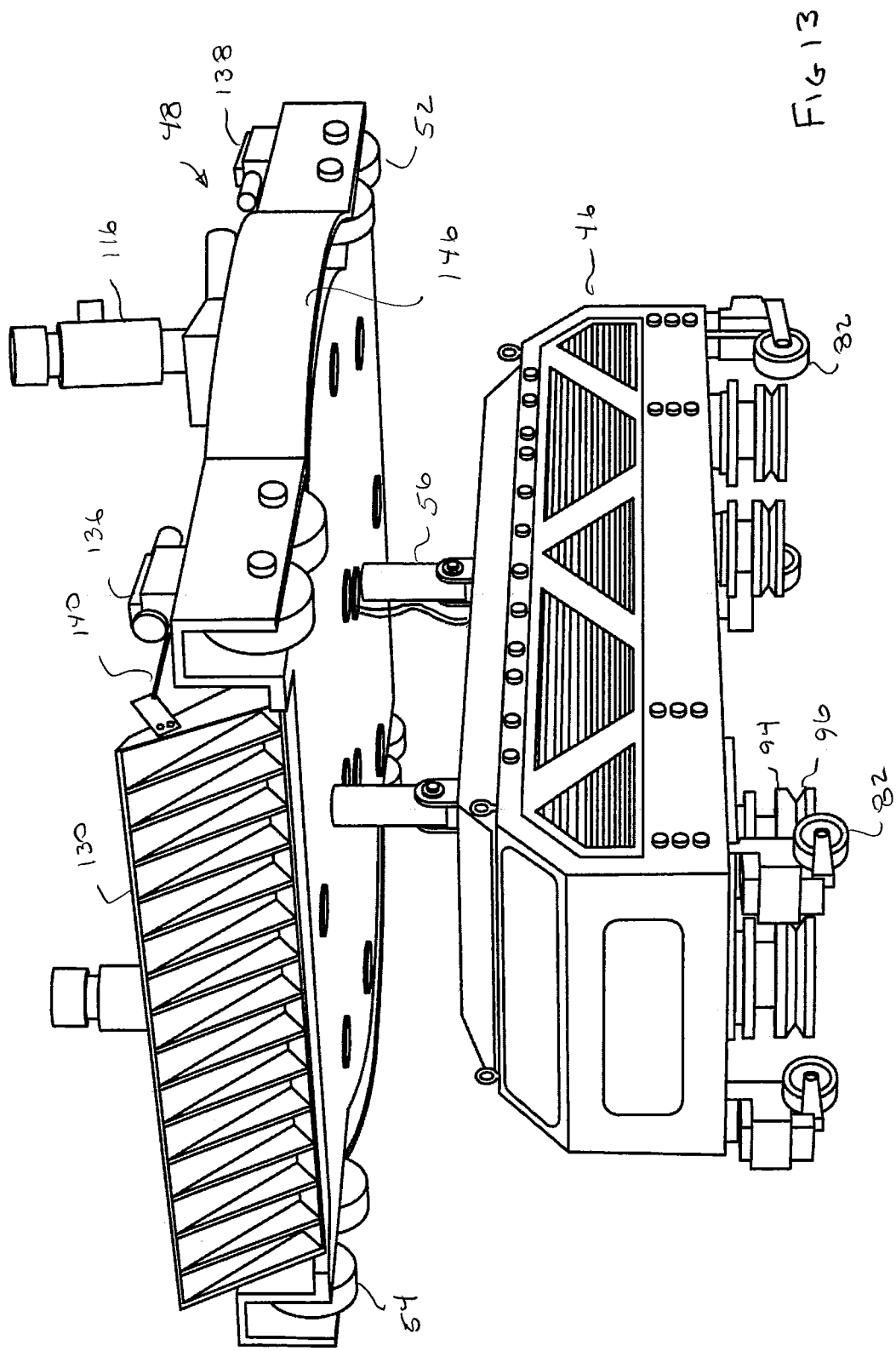

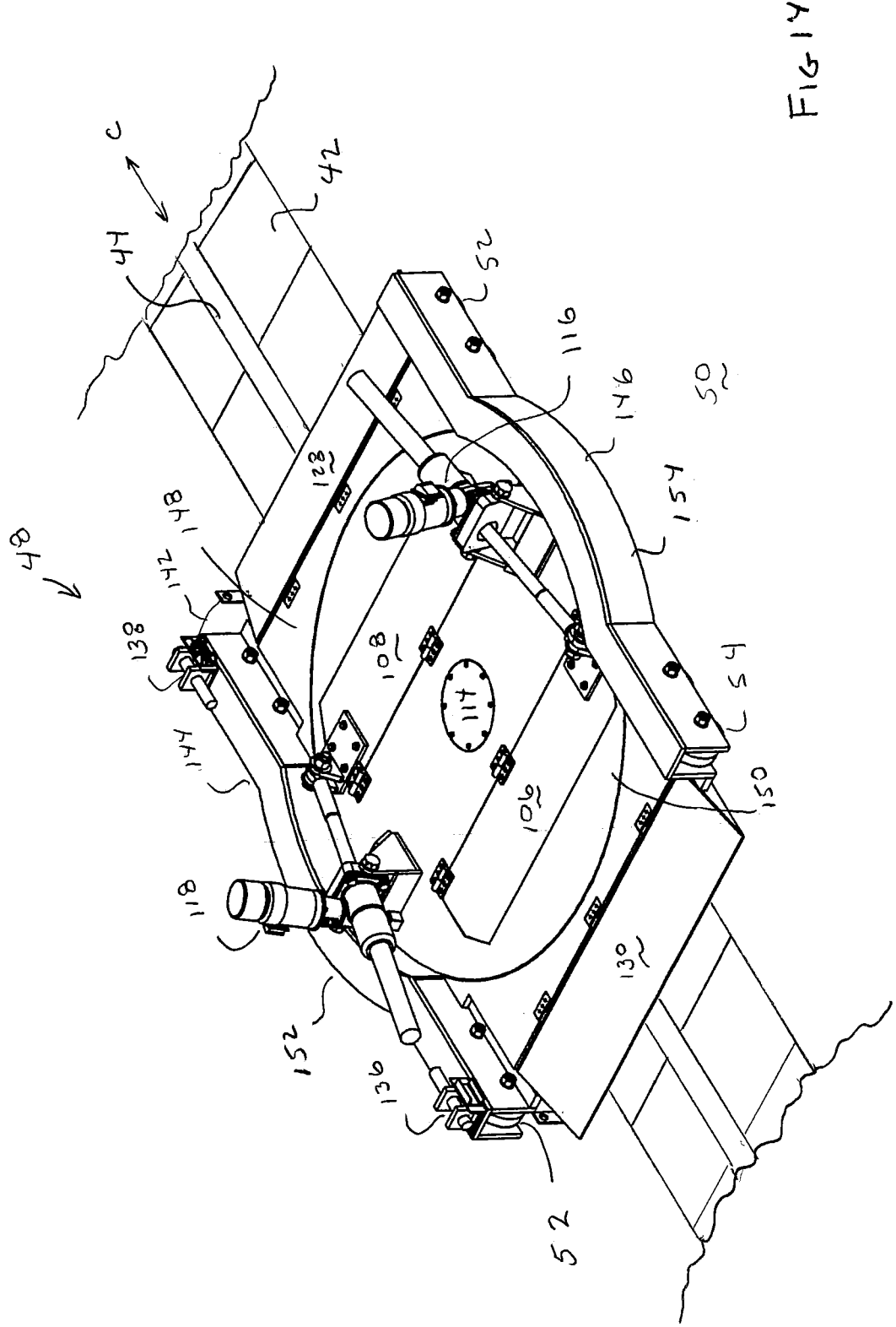

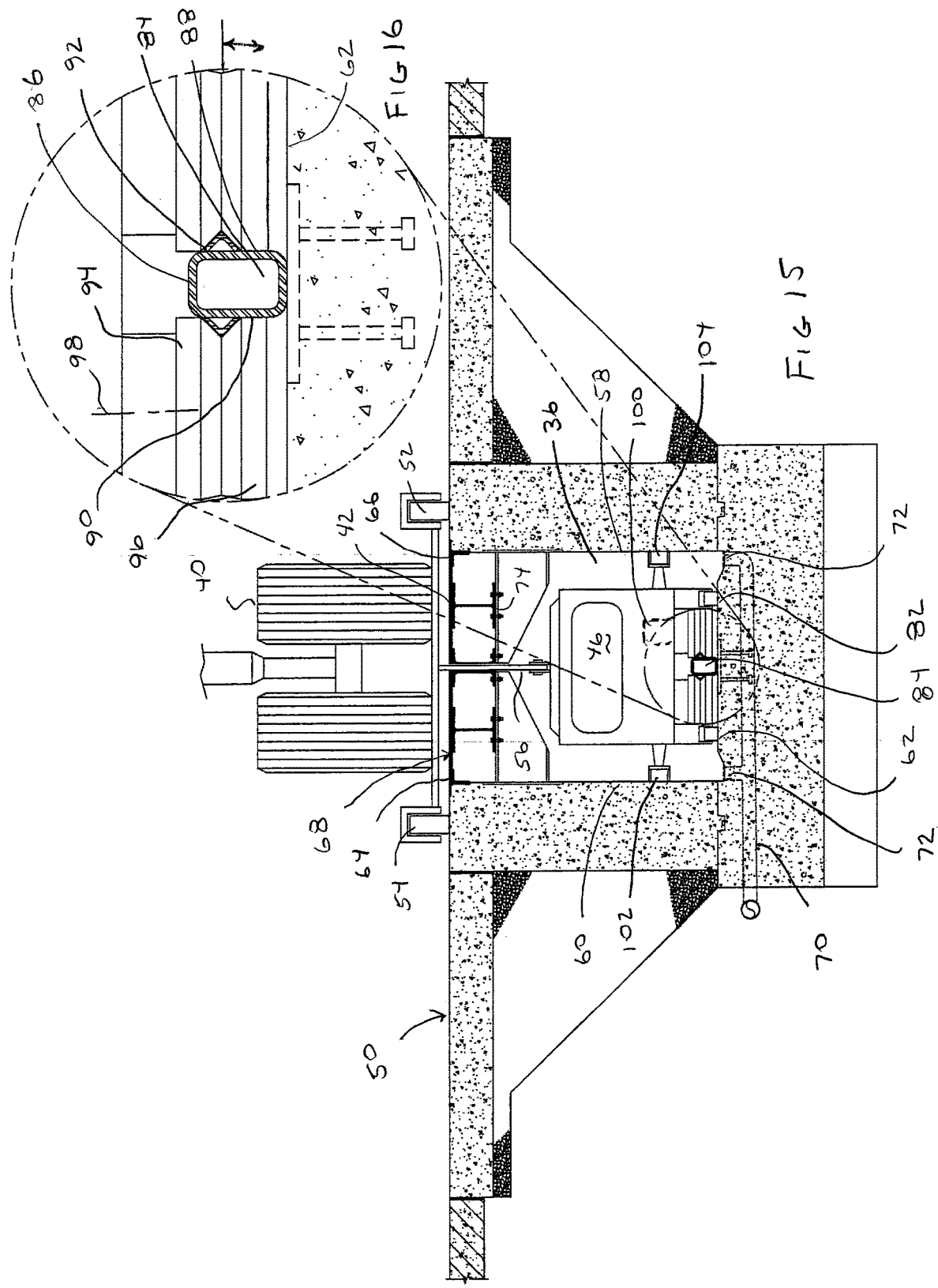

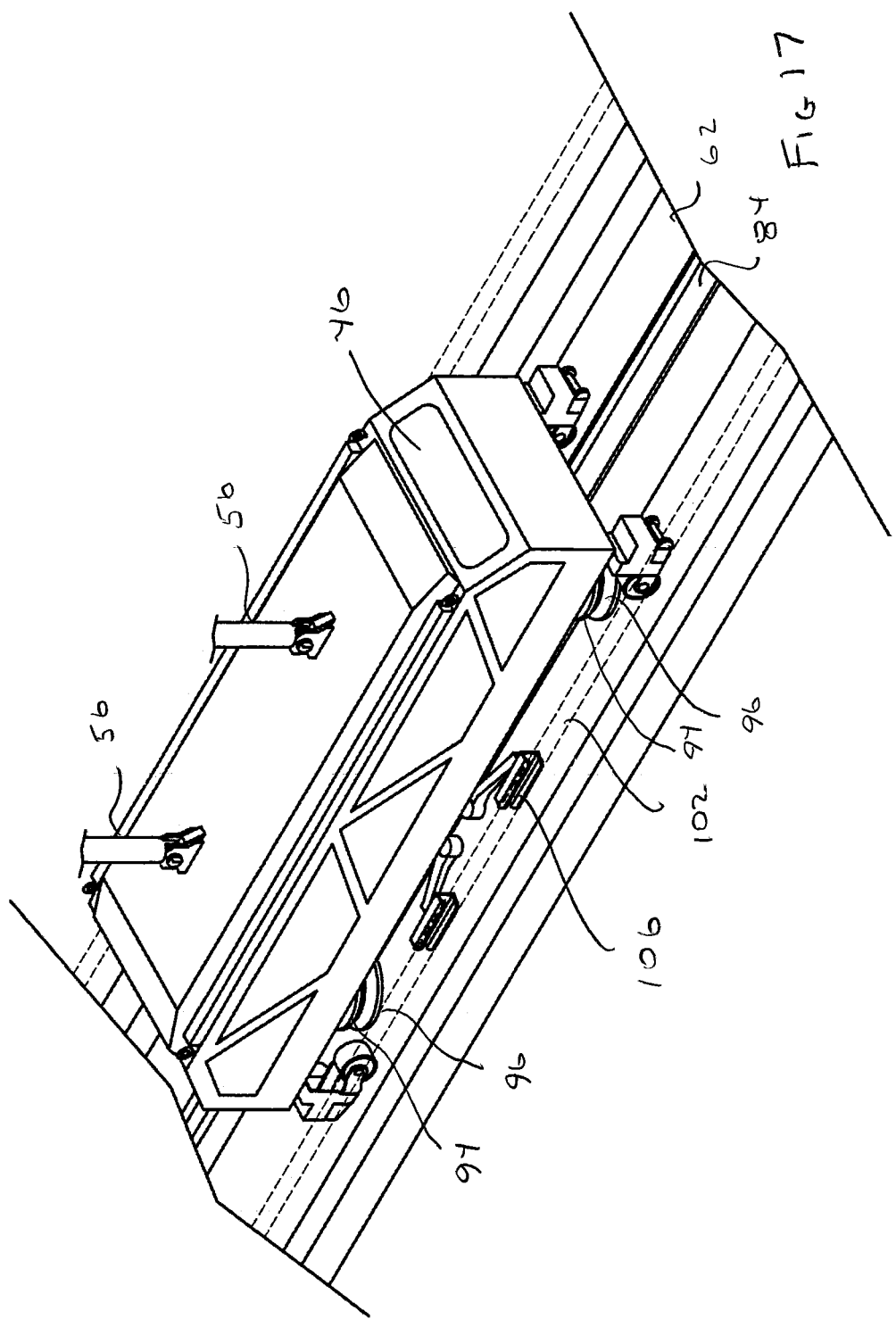

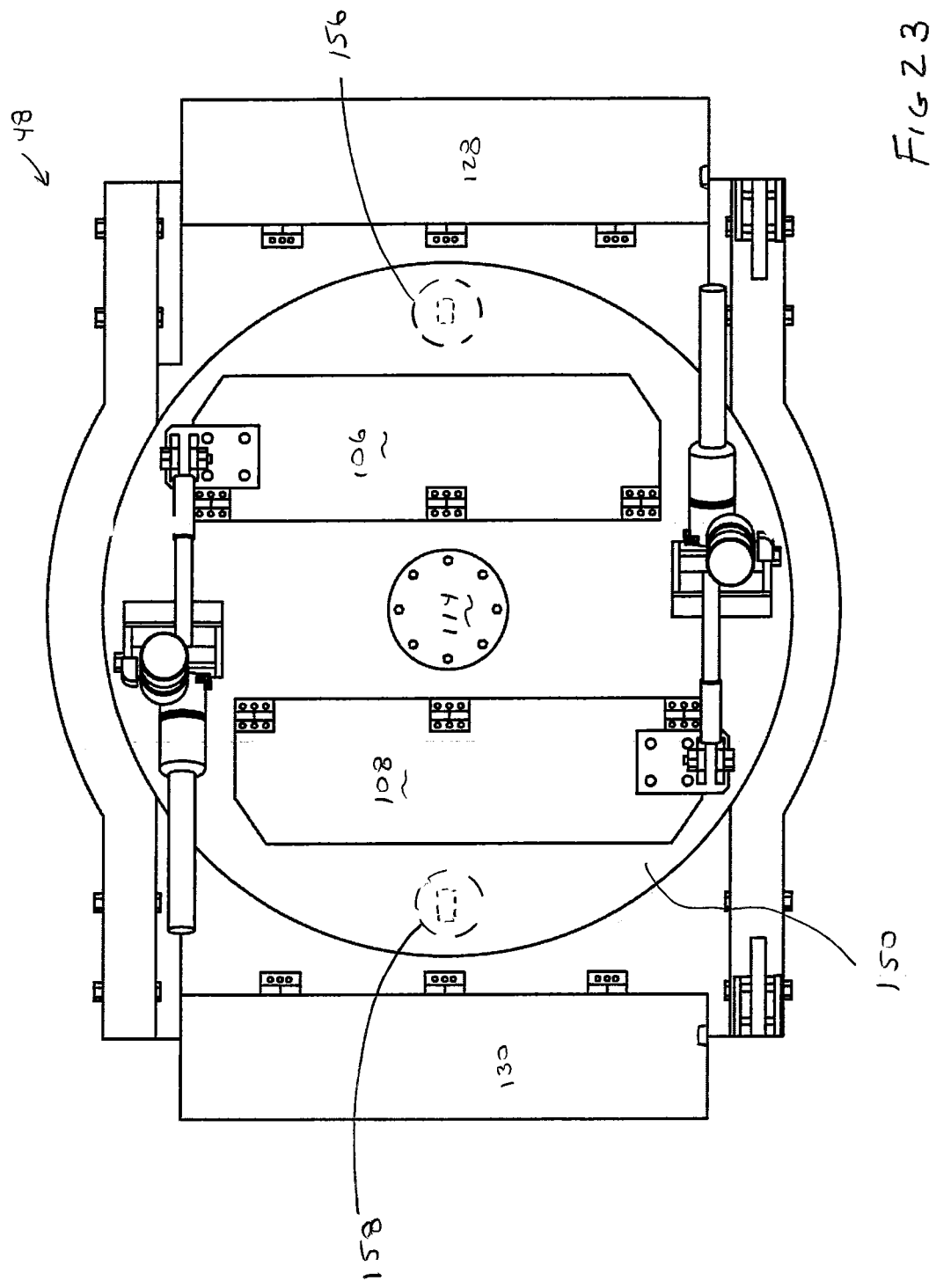

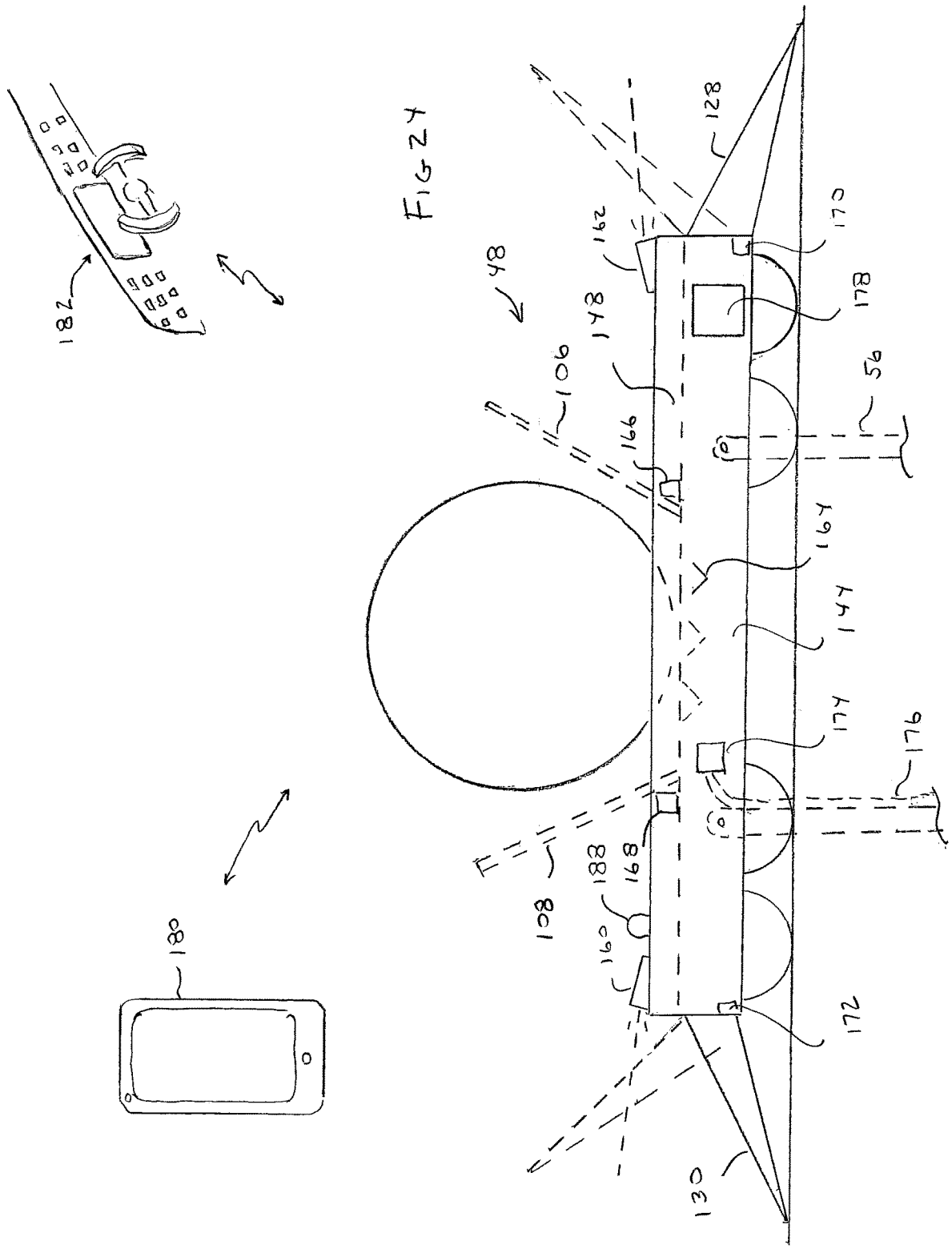

SYSTEM FOR TRANSPORTING AIRPLANES ON AN AIRPORT APRON

TECHNICAL FIELD

The exemplary arrangements relate to a system used for transporting airplanes on an airport apron. Airplanes may be moved from a parking location to a take-off location adjacent a runway, or from a landing location adjacent a runway to a parking location at a terminal, or for example a parking location at a servicing location or a fueling location.

BACKGROUND

Airplanes generally move on an airport apron, from a parking location to a runway or from a runway to a parking location after landing, under their own power, with the engines on. Attempts have been made to develop another system for transporting airplanes on the airport apron from a landing/take-off location to a parking location and vice versa.

An assembly for transporting an airplane on an airport apron from a parking location to a take-off location and from a landing location to a parking location with an airplane's engine off is known from the Polish patent specification No. PL216097B1. The assembly comprises docking stations made in a surface of access ways (taxiways) to a runway of an airport. Docking stations are connected to guiding grooves located along the route of airplane movement to a parking location. In the docking stations there are mounted leading mandrels, which are preferably fastened to the front wheel of the airplane after bringing it to the docking station. From the main transport route the terminal transport routes are branched off. Guiding grooves which constitute such routes are covered from the top with pivotable gratings having a segmented structure. The pivotable gratings automatically open in front of the leading mandrel moving in the guiding groove. After passage of the leading mandrel, the pivotable gratings close. In places where the guiding grooves change their direction, in places where there are abrupt curves and in junctions of the main transport route to the terminal transport route, switching devices are installed.

From the Polish patent specification No. PL216097B1 a carriage assembly is known. The carriage assembly is intended for a system for transporting airplanes on the airport apron, from a parking location to a runway and from a landing location to a parking location. The system for transporting airplanes on the airport apron is formed by guiding channels. In the guiding channels leading mandrels are movable, said mandrels being installed in docking stations and hook-mounted to the airplane. The guiding channels are covered from the top by pivotable plates of a segmented structure. The carriage assembly moves in a guiding channel that has a rectangular cross-section, the bottom of which is provided with lower guiding rails and its sidewalls are provided with side guiding rails and a carriage that constitute spatial constructions. The carriage construction has a bottom part and side parts. The carriage is provided with a set of lower ground wheels seated in the bottom part of the carriage and a set of side ground wheels seated in both side parts of the carriage.

Systems for transporting airplanes on an airport apron may benefit from improvements.

Discussion

An aspect of some exemplary arrangements is a system of driving channels for a carriage that transports airplanes on the airport apron, in particular from a landing location to a parking location and from a parking location to adjacent a take-off location. The system of channels is intended to provide easy assembling thereof on an existing airport apron in a fast and safe manner, since it may be implemented stepwise, and causes making inoperative only a small area of the airport apron for the time necessary for installing the system. As a result of the use of this exemplary system an airplane may be lighter due to need for less fuel, more cost-effective in use, and will decrease emission of toxins into the environment as well as enhance safety during taxing by means of automatic control systems that control airplane traffic within the airport.

According to an exemplary arrangement, a carriage assembly is intended for a system for transporting airplanes on the airport apron, from a parking location to a runway and from a landing location to a parking location. The exemplary system for transporting airplanes on the airport apron is formed by guiding channels. In the guiding channels leading mandrels are movable. The mandrels are installed in docking stations and hook-mounted to the airplane, and the guiding channels are covered from the top by pivotable plates of a segmented structure.

According to an exemplary arrangement, a system of driving channels is provided for a carriage for transporting airplanes on the airport apron. The carriage includes an actuator or a mandrel with a basket seated thereon. The carriage is movable in the channels which are arranged in taxi routes from at least one airplane landing location to at least one parking location and from at least one parking location to at least one take-off location adjacent to a runway. Exemplary arrangements include channels formed by adjacent channel segments. The channel segments are depressed and extend downward in the airport apron so that their top surface and the opening thereof and associated cover plates are generally at a level flush with the surface of the airport apron.

In some exemplary arrangements, channel segments may comprise straight channel segments.

In some exemplary arrangements, channel segments may comprise crossing channel segments.

In some exemplary arrangements, channel segments comprise bifurcating channel segments.

In some exemplary arrangements, channel segments comprise turning (e.g. curved) channel segments.

In some exemplary arrangements, the plurality of adjacent channel segments define elongated driving channels that define taxi transporting routes and terminal transporting routes for airplanes. Such routes may include for example routes on the airport apron between an area adjacent runways such as landing sites to parking locations adjacent an airport terminal, such as a passenger terminal. The driving channels may also extend from such terminals to areas adjacent to various runways of the airport. Elongated driving channels may also extend to parking locations such as fueling locations, repair locations, storage locations, hangar locations or other locations to which airplanes may desirably be transported within the airport or similar facility.

In some exemplary arrangements, each of the channel segments is provided with at least one driving unit comprising a motor, and a transmission gear, that puts in motion a carriage that transports the airplane. The motor may be for example, an electric, pneumatic, hydraulic or combustion motor, and said transmission gear may include for example, one or more of a friction gear or roller, toothed gear, tension gear such as a wire rope or cable, chain gear such as a drive chain, belt or band or similar moving member, transmission, shaft gear such as a worm gear. In some exemplary arrangements, the driving unit comprises a magnetic drive.

Also, channel segments along their entire length may provide at their upper opening, a surface including movable plates of a segmented structure. The plates may be selectively openable when necessary such as to retract a portion of a wheel engaging basket into the upper opening.

In some exemplary arrangements, the movable plates are positioned when in a closed position to provide an open elongated slot. An actuator attached to the transporting carriage is movable along and within the slot. The actuator may movably support and carry a basket of the transporting carriage, in which at least one front wheel of the airplane being transported is seated and held in engagement.

In some exemplary arrangements, the channel segments along their entire length are provided at their upper open surface with slidable or pivoting plates of a segmented structure, openable when necessary. In a closed position a central portion of opposed plates abound an elongated slot in which at least one actuator attached to the transporting carriage is movable. The actuators support a basket of the transporting carriage, in which the at least one wheel of the airplane being transported is/are seated.

In some exemplary systems, activating and stopping of the individual motors and transmission gears associated with the channel segments that transport airplanes are controlled fully automatically by one or more control systems. The systems are monitored by the ground personnel of the airport, preferably in cooperation with the pilot of the airplane.

In other exemplary arrangements a basket may move on wheels in operatively supported connection with the airport apron. In such arrangements the carriage may selectively move along the channel direction within the elongated driving channel. The basket includes a plurality of wheels that are engaged with the apron, at least some of which extend on transverse opposed sides of the driving channel. The carriage is connected to the basket through at least one vertically extending connector that extends through an elongated slot between plates that are positioned in the top opening of the channel.

The exemplary basket includes a pair of basket side plates that are selectively movable between upward and downward positions. The basket side plates are disposed from one another along the channel direction and in the upward position extend transverse to the channel direction. The exemplary basket further includes a pair of ramps. The ramps are positioned at opposed ends of the basket along the channel direction. Each of the ramps is movable between a down ramp position in which the distal end of the ramp is generally at the level of the airport apron, and an up ramp position in which the distal end opposed upwardly away from the level of the airport apron. At least one actuator is in operative connection with each of the basket side plates and the ramps. The at least one actuator is selectively operative to move and position the basket side plates and the ramps.

In the exemplary alternative arrangement the basket and at least one front wheel of an aircraft are selectively movable along the channel direction. With a ramp and a basket side plate of the basket aligned with the at least one from wheel, the aircraft and the basket are relatively movable such that the at least one front wheel is movable along the ramp in the down ramp position, across the basket side plate in the downward position, and into engagement with a central wheel supporting portion of the basket. The at least one actuator is then operative to move both of the basket side plates to be in the upward position and both of the ramps to be in the up ramp position. In the upward position the basket side plates are operative to hold the at least one front wheel engaged with the basket while the basket is movable in the channel direction responsive to movement of the carriage in the driving channel.

In this exemplary arrangement the carriage may move in a driving channel that is straight, curved or with another configuration and operate to move the aircraft with the at least one front wheel thereof held engaged with the basket along the straight, curved or other channel direction.

When the aircraft has been transported in engagement with the basket to a location in which the aircraft is to be positioned, the at least one actuator moves at least one of the basket side plates from the upward position to the downward position so that the at least one front wheel is no longer held in engagement with the basket. At least one of the ramps on the same side of the central wheel supporting portion as the basket side plate that is in the down position, is moved by the at least one actuator to the down ramp position. The aircraft and the basket are then moved relative to one another along the channel direction so that the at least one front wheel is moved from the central wheel supporting portion, downward on the ramp and into engagement with the airport apron.

Numerous other features and capabilities are described in connection with the exemplary arrangements discussed in the following detailed description.

BRIEF DESCRIPTION OF DRAWINGS

FIG. 11 shows a straight channel segment in cross-section.

FIG. 12 shows an alternative exemplary arrangement of a system for moving aircraft on airport apron.

FIG. 13 shows an exemplary carriage and an exemplary basket of the alternative arrangement.

FIG. 14 shows a top front right perspective view of the basket of the alternative arrangement and the upper surface of a driving channel.

FIG. 15 is a cross-sectional view showing the components of the alternative system below the airport apron.

FIG. 16 is an enlarged view of a portion of the bottom surface of the driving channel and a rail that is used in moving the carriage along the channel direction in the driving channel.

FIG. 17 is a top front right perspective view of an exemplary carriage.

FIG. 23 is a top view of the exemplary basket with exemplary fasteners for disconnecting the basket from the vertically extending connectors that extend between the basket and the carriage.

FIG. 24 is a schematic side view of the exemplary basket and an exemplary portable wireless device and airplane cockpit device that may be used to wirelessly communicate with sensors associated with the basket and control the actuators which move the basket side plates and ramps.

DETAILED DESCRIPTION

Figure 1:
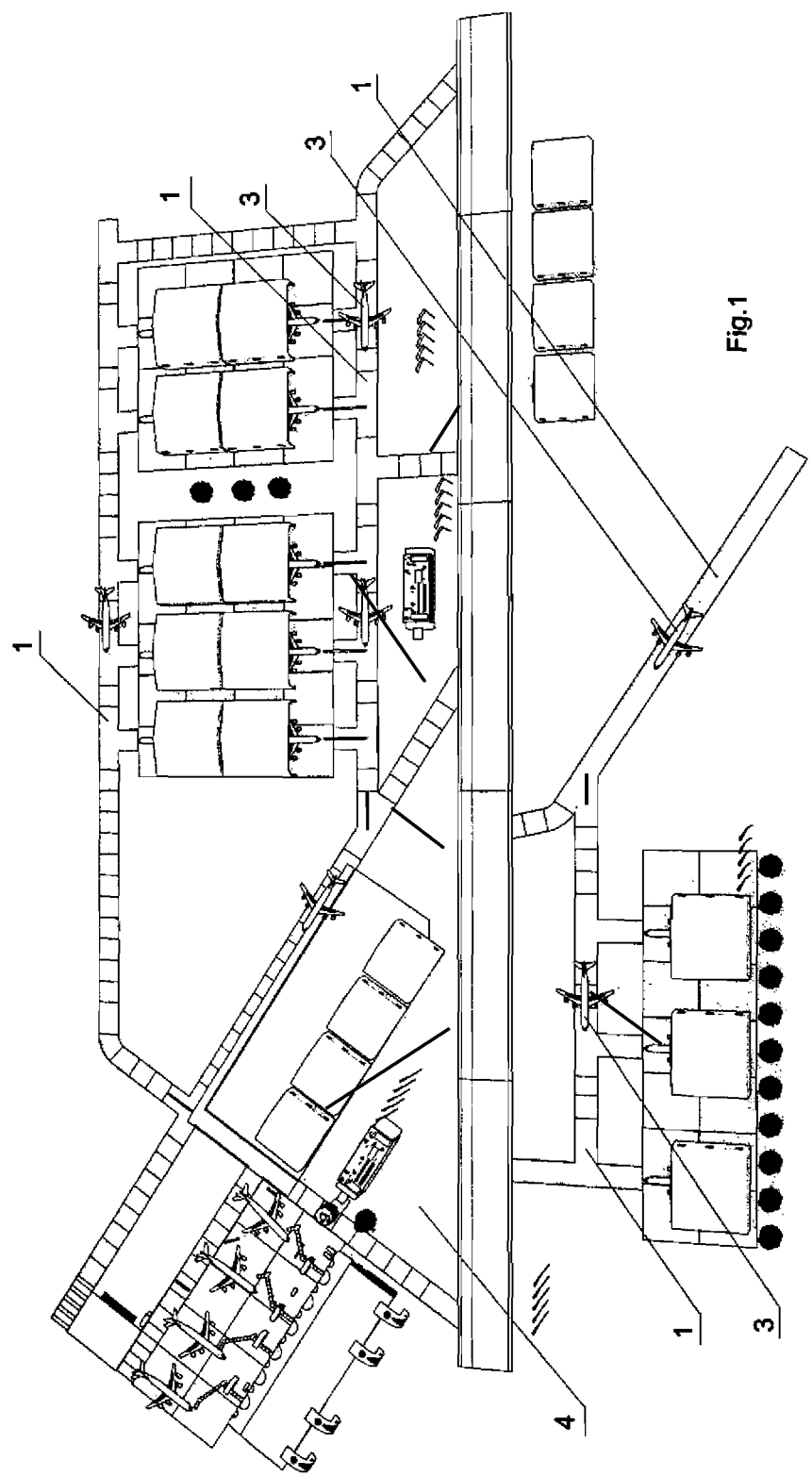
FIG. 1 shows an exemplary airport apron with driving channels arranged thereon along with airplanes being transported, in a top view.

In the exemplary arrangement shown in FIG. 1, an airport intended for taking-off and landing airplanes 3 is represented. The airport has an airport apron 4 that extends adjacent to take-off/landing locations as well as to defined parking locations for airplanes 3. From such a take-off/landing location of an airplane 3 to a parking location, the airplane 3 has to move on the airport apron 4. For this purpose driving channels 1 are formed in the airport apron 4, as schematically presented in FIG. 1. Airplanes are alternatively referred to herein as aircraft.

Figure 8:
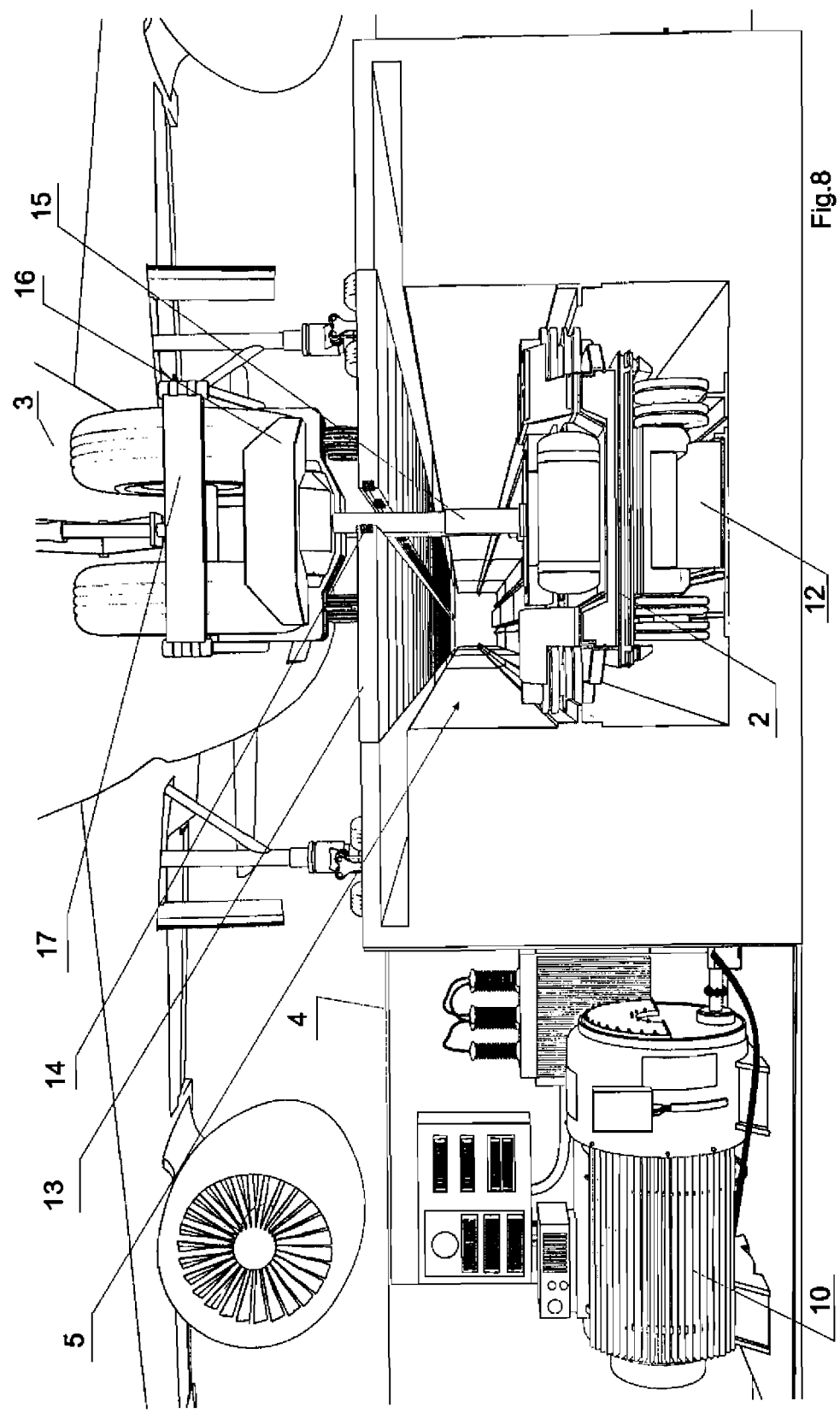
FIG. 8 shows a channel segment in cross-section.

In an exemplary driving channel 1 formed in the airport apron 4, a transporting carriage 2 is selectively movable. The carriage has at least one carriage actuator 15. The actuator 15 in this arrangement serves as a vertically extending connector. A basket 16 is operatively attached to the carriage and the actuator. At least one portion of the basket may be moved selectively upward and downward relative to the carriage responsive to the actuator. The basket is configured so at least one wheel 17 of an airplane 3 may be positioned and engaged therewith, as shown in FIG. 2, FIG. 8, and FIG. 11.

In this exemplary arrangement the basket 16 includes a pair of opposed basket side plates 20, 22. The basket side plates are disposed from one another along the channel direction generally indicated C. The basket side plates comprise portions of the exemplary basket that are selectively movable between an upward position and downward position relative to the carriage. Intermediate of the exemplary basket side plates along the channel direction is a central wheel supporting section 24. A pair of basket side rails 26, 28 extend generally along the channel direction and are transversely disposed from one another relative to the channel direction. As used herein the term generally parallel to the channel direction means within plus or minus 30° of the channel direction. In the exemplary arrangement the basket side rails 26 and 28 extend upwardly above the central wheel supporting portion 24 and are disposed transversely from one another such that the at least one front wheel the aircraft is enabled to be positioned intermediate of the basket side rails. In this exemplary arrangement the basket side plates in a downward position enable relative movement of the basket and the aircraft so that at least one front wheel of the aircraft may be in engagement with the basket, and in the upward position of the side plates the at least one front wheel is held engaged with the basket so the aircraft may be moved along the channel direction responsive to movement of the carriage in the driving channel. Of course this approach is exemplary and other arrangements other approaches may be used.

In this arrangement, on the basket 16 in operative connection with the transporting carriage 2 the at least one front wheel of the plane 3 may be positioned and held in engaged relation. Of course, the term front wheel 17 of the airplane 3 also includes a front wheel assembly that may comprise multiple wheels, for example twin wheels. An exemplary arrangement of the at least one actuator may include movement devices such as hydraulic or pneumatic cylinders, electrical motor driven struts, feed screws, rotary actuators or other components that are selectively operable to selectively move the basket or portions thereof, generally vertically up or down relative to the carriage. It should further be understood that while in the exemplary arrangement the basket shown is configured to operatively engage at least one front wheel of the airplane by having the wheel positioned therein, in other exemplary arrangements the basket may include different structures. These may include, for example, engaging structures that operatively engage the wheels by engaging other wheel portions or portions of the landing gear to which the wheels are attached so as to selectively engage such structures such that they can be moved with the carriage, thereby moving the airplane.

Figure 2:
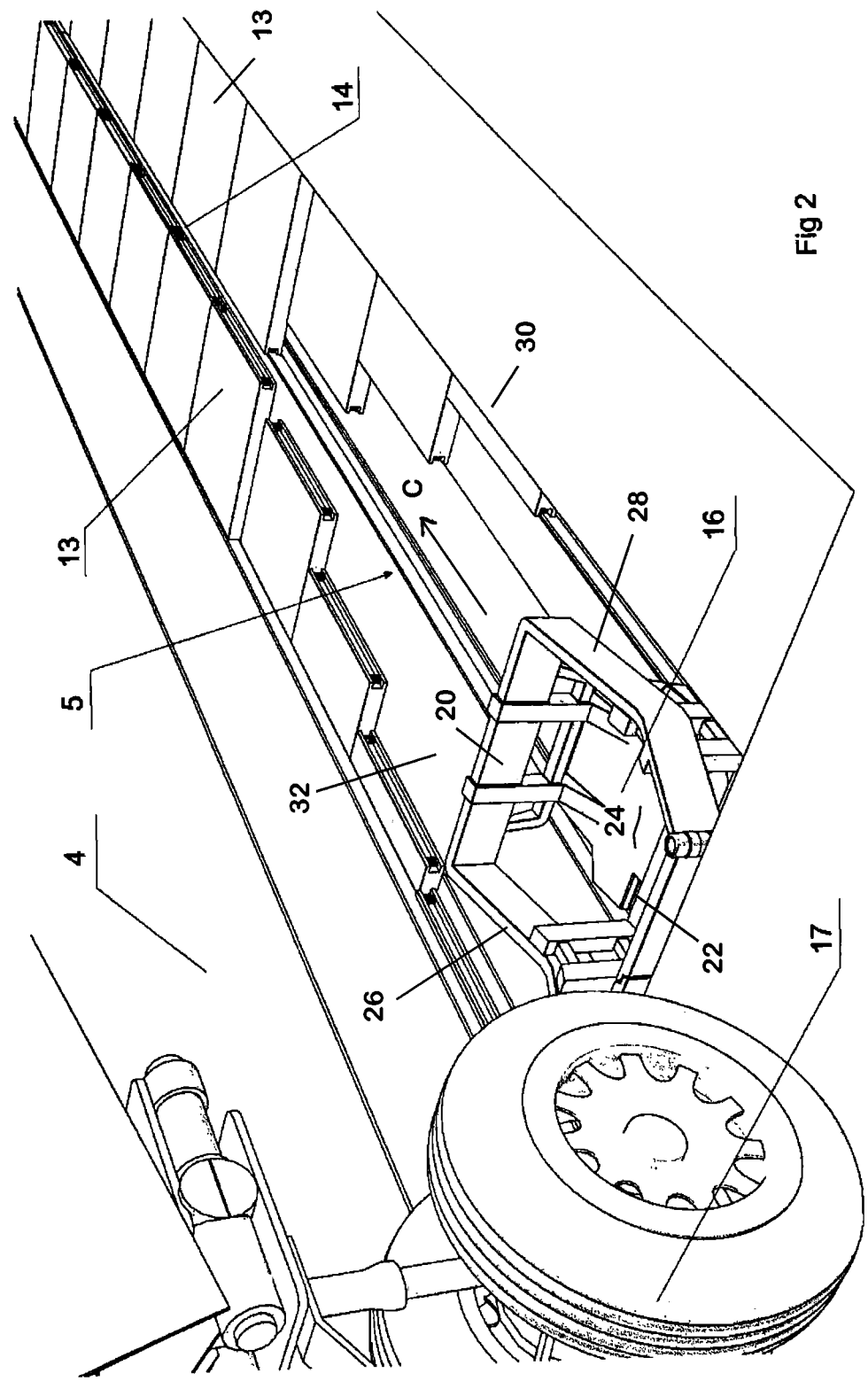
FIG. 2 shows an exemplary carriage in a guiding channel segment with a basket on which at least one wheel of the airplane rides during transport.
Figure 3:
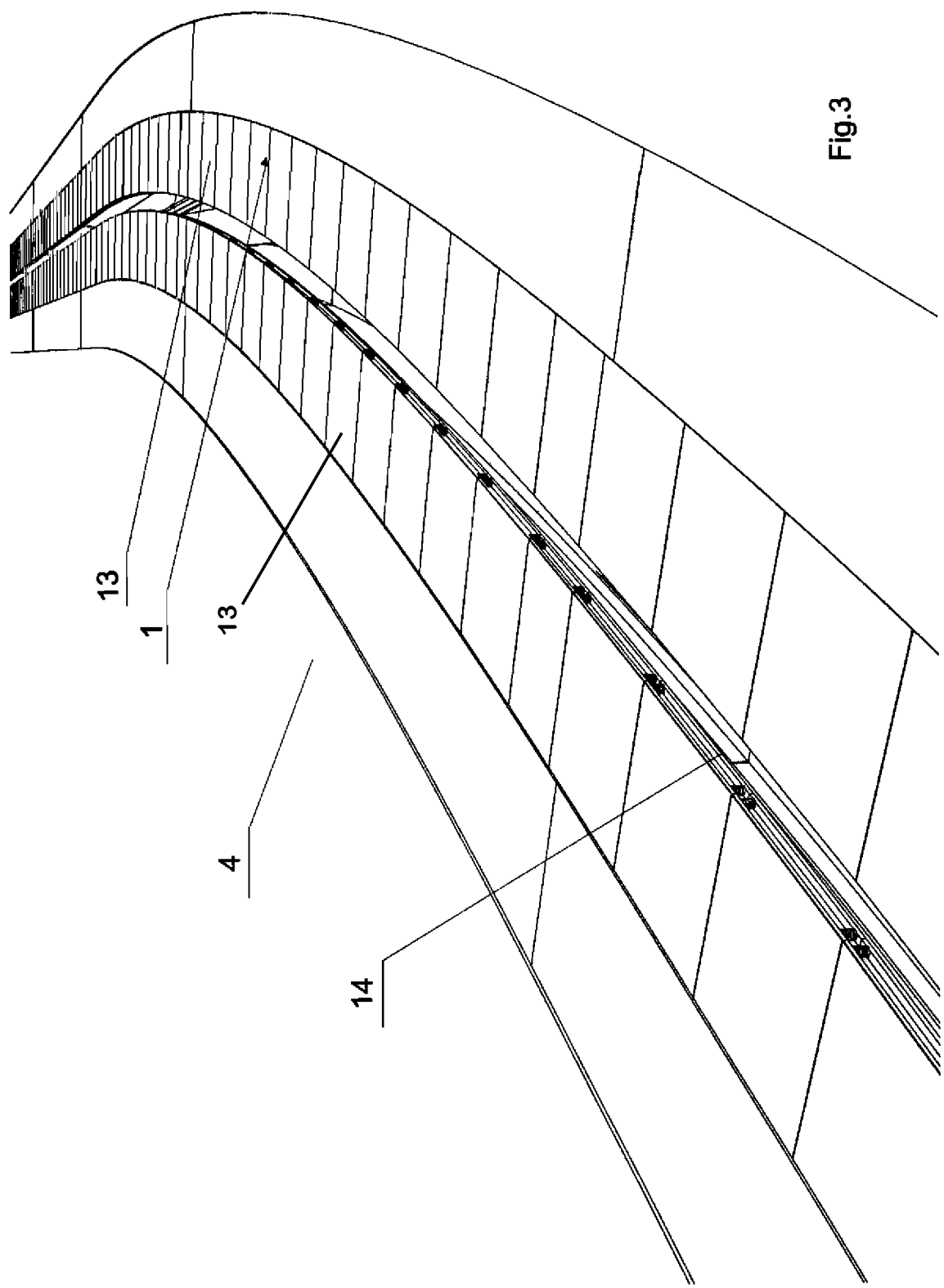
FIG. 3 shows the airport apron with a driving channel covered by movable plates that bound an elongated slot.
Figure 4:
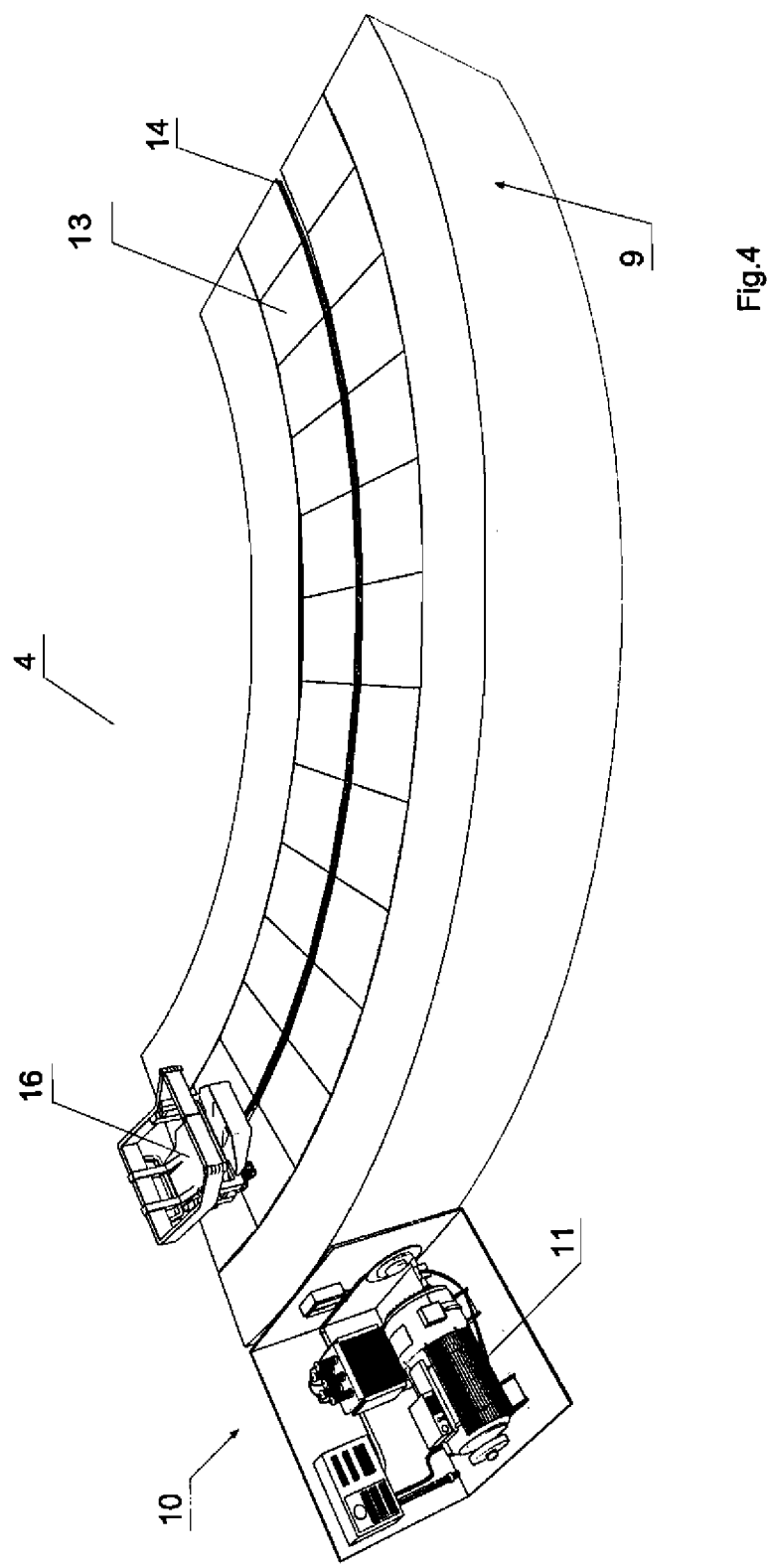
FIG. 4 shows a turning (curved) channel segment.
Figure 5:
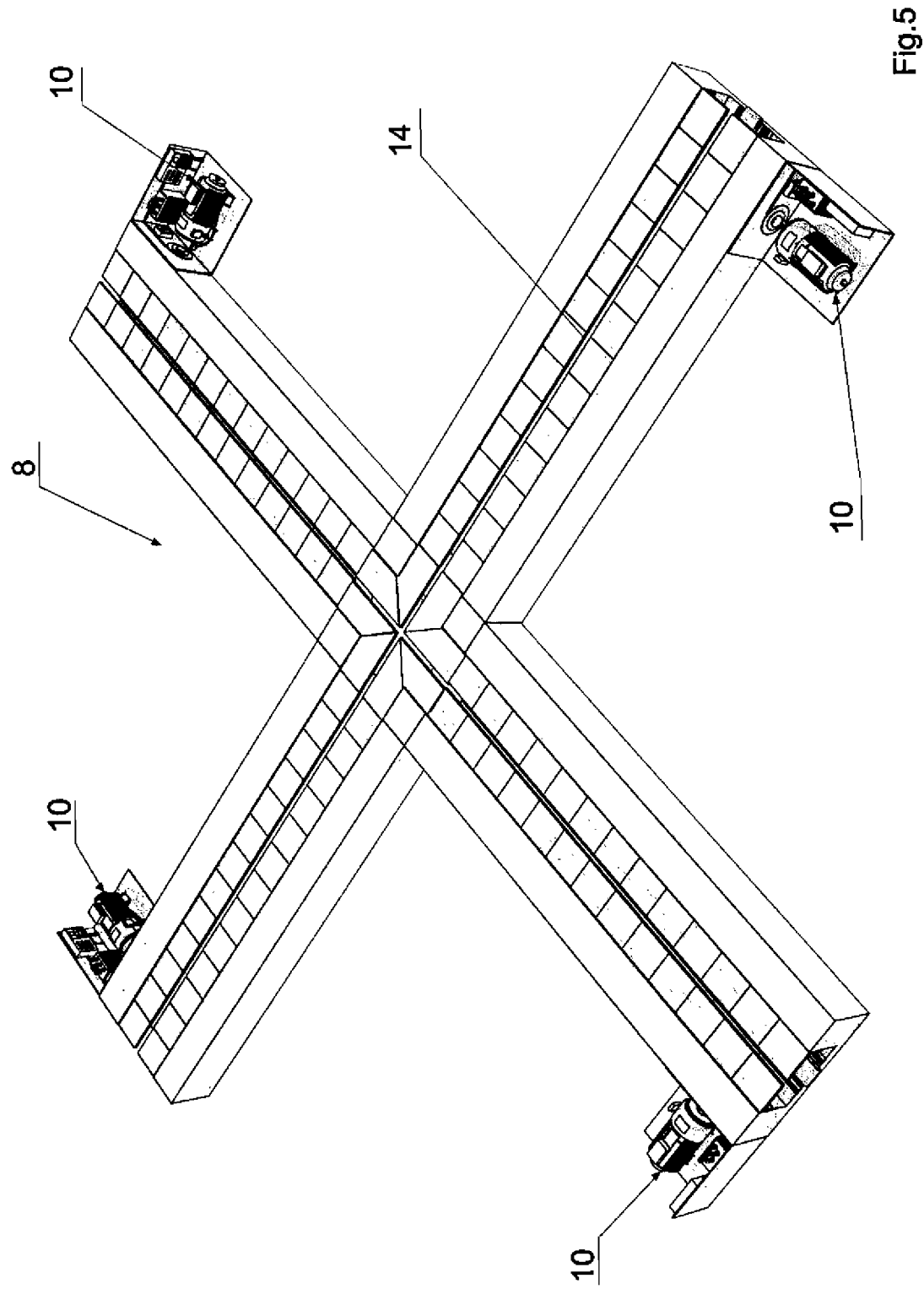
FIG. 5 shows crossing channel segments.
Figure 6:
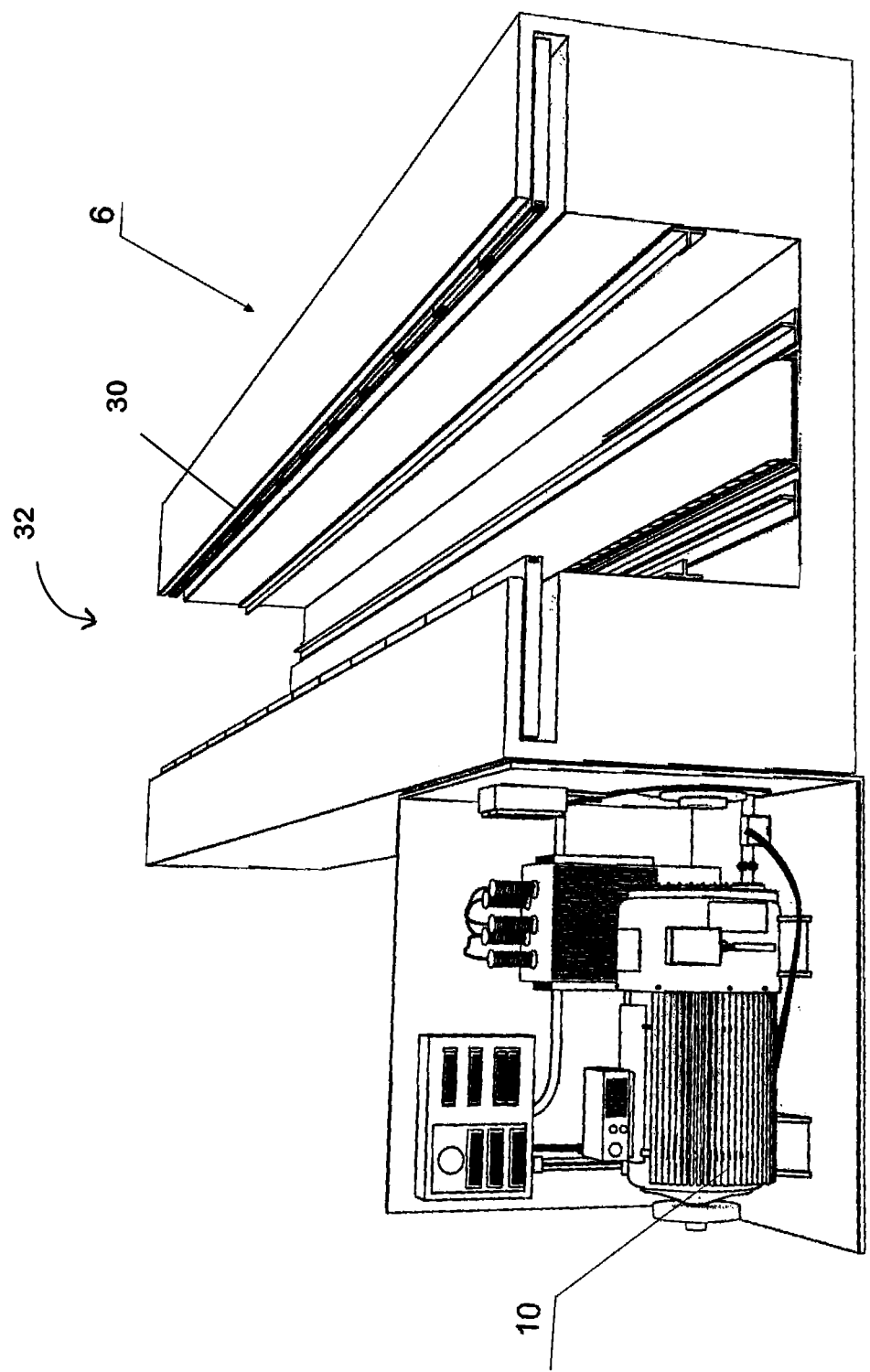
FIG. 6 shows a straight channel segment.
Figure 7:
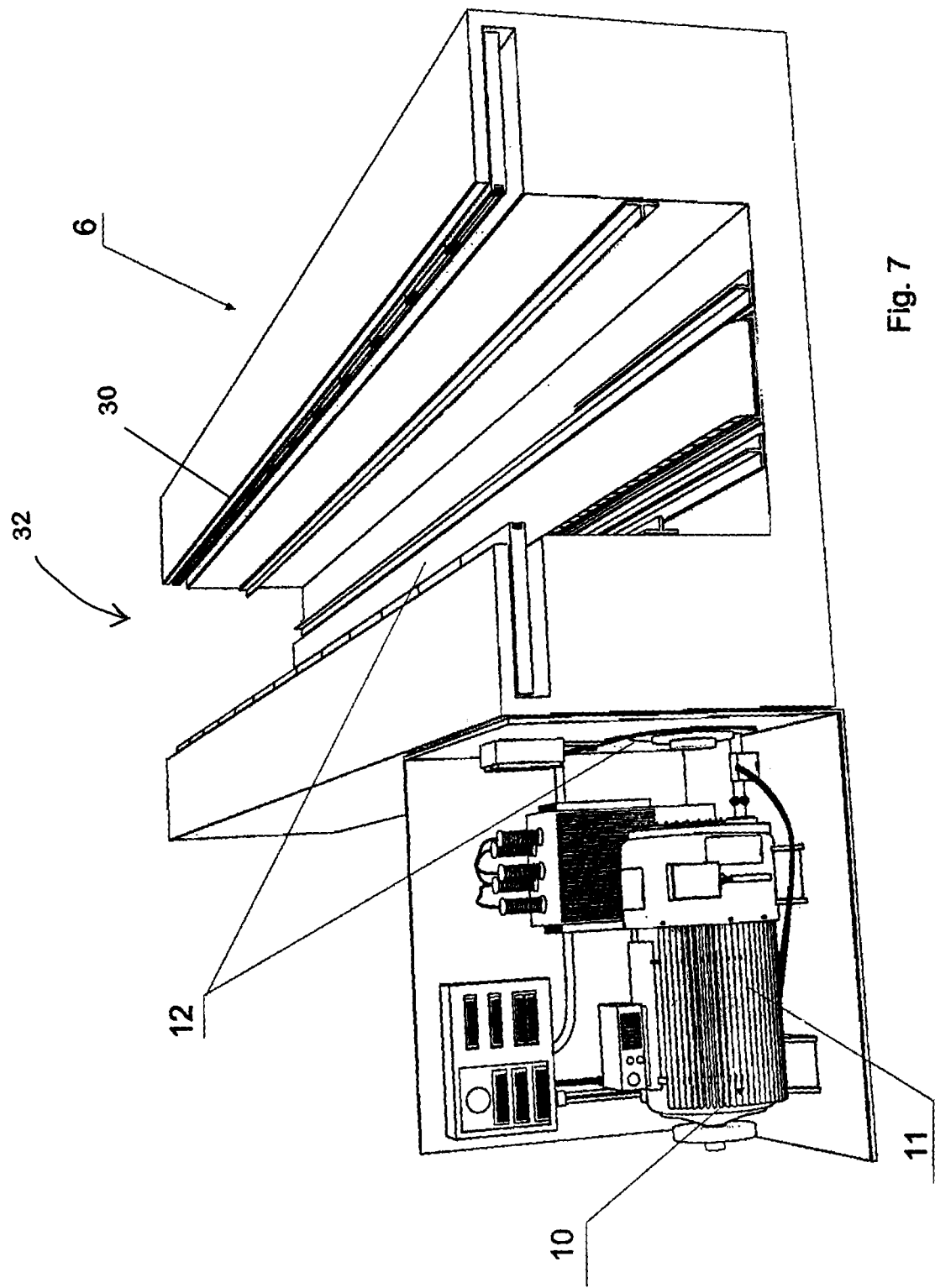
FIG. 7 shows a straight channel segment.
Figure 9:
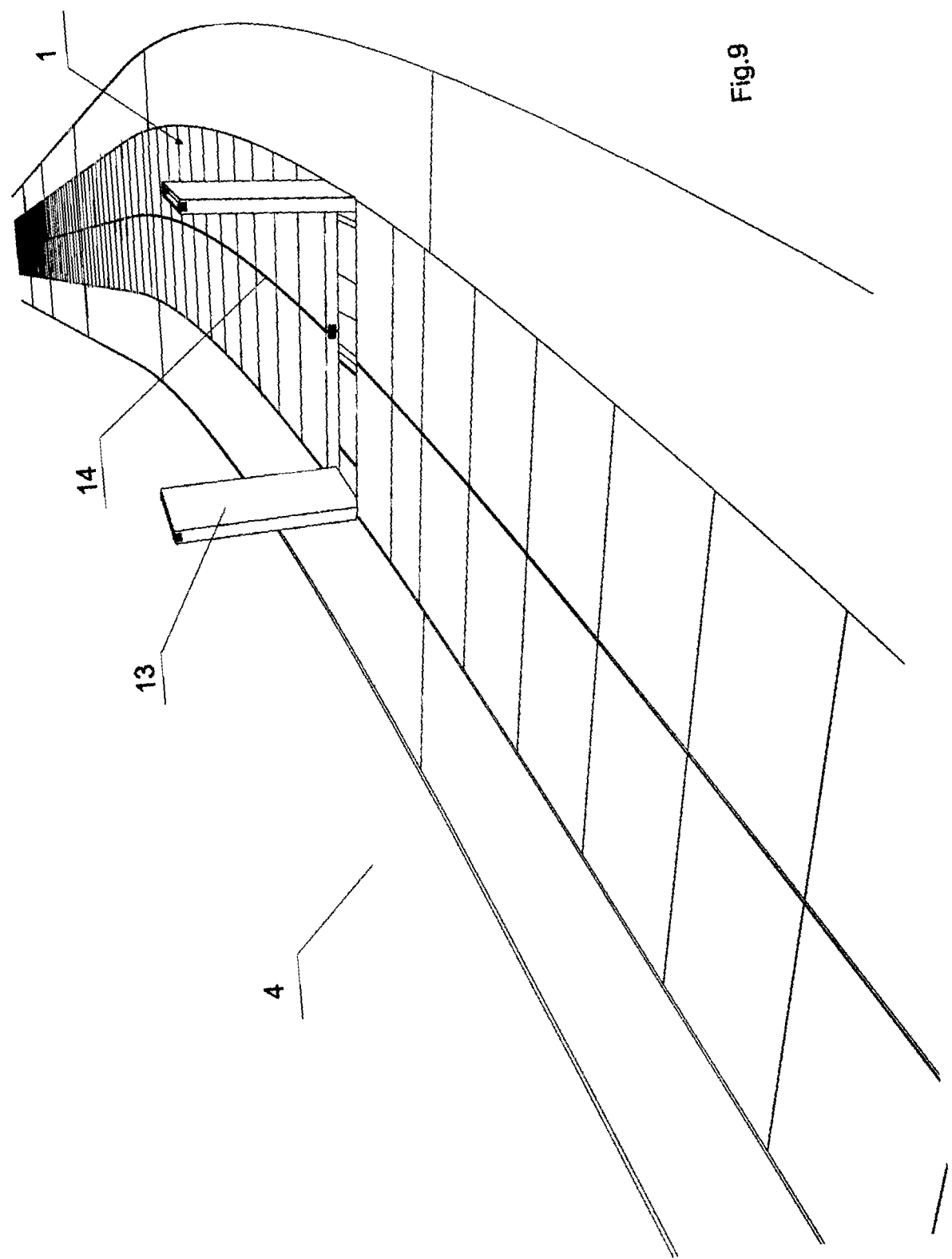
FIG. 9 shows an airport apron with some open pivotable plates.
Figure 10:
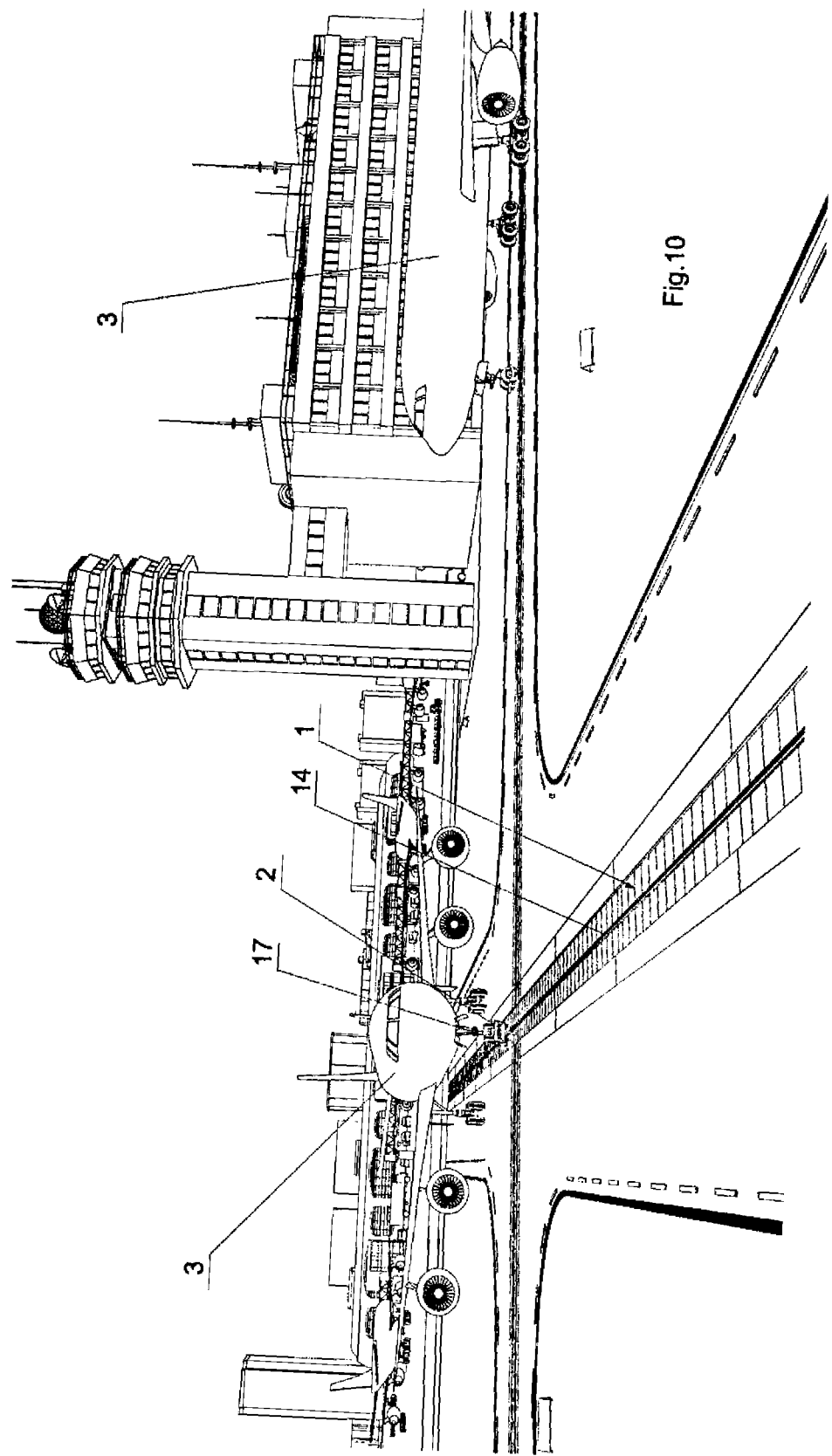
FIG. 10 shows a part of an airport with crossing driving channels.

FIG. 2 shows schematically a wheel 17 of an airplane 3 positioned in aligned relation with the channel direction and with the exemplary basket 16 that is in operatively connected relation with a transporting carriage 2 located within a driving channel 1. In this exemplary arrangement the at least one front wheel of the airplane may move in generally aligned relation with the channel direction relative to the basket to achieve engagement between the at least one front wheel and the basket. This arrangement enables the at least one front wheel and the associated landing gear to engage with and subsequently be moved in engagement with the basket without the landing gear being subjected to forces imparted by the basket moving the front landing gear structure transversely to the direction in which the landing gear structure is configured to normally be subject to forces during takeoff and landing of the aircraft. This feature of the exemplary arrangement reduces the risk of the front landing gear to which the at least one front wheel is attached being subject to undesirable and potentially damaging transverse forces while being moved by the apparatus. The exemplary carriage structure within the channel segment is not visible during movement of the transporting carriage 2 within the driving channel 1. The exemplary driving channel 1 in this arrangement is usually covered with segmented movable plates 13. In some arrangements plates may be movable by being pivoted upward, as shown in FIG. 9, or movable slidably aside so as to open portions of the upper opening of the driving channel 1, as shown in FIG. 2 and FIG. 8. In some exemplary arrangements, the channel segments may include features like those described in U.S. Pat. No. 9,248,919 which is incorporated herein by reference in its entirety.

The exemplary driving channel 1, within which the transporting carriage 2 is moved for transporting airplanes 3 from a take-off/landing location to a parking location, has to be routed in a way so as to enable movement of the airplane 3 between these desired locations. Therefore the driving channel may cover a considerable part of the airport apron 4 which involves certain problems during laying the transporting channel 1 on the existing airports and, at a lesser extent, on airports under construction.

In order to ensure efficient installation of the driving channel 1, as well as enabling stepwise construction thereof, the exemplary driving channel 1 is formed of channel segments 5. Such channel segments constitute lengths of the driving channel 1 being built. Exemplary channel segments 5 are shown in FIG. 2, FIG. 4, FIG. 5, FIG. 6, FIG. 7 as well as in FIG. 8 and FIG. 11.

Due to the fact that the exemplary driving channel 1 may be routed along a path with curved turns, bifurcations (e.g. branching from a single channel to multiple channels or combining multiple channels to converge into a single channel) and crossings, channel segments 5 have such configurations to allow for such arrangements. This is why the exemplary system of driving channels 1 for a carriage 2 that transports airplanes 3 on the airport apron 4 comprises straight segments 6, shown in FIG. 6 and FIG. 7, crossing segments 7, shown in FIG. 5, turning segments 9, shown in FIG. 4, and bifurcating segments. In exemplary arrangements, such channel segments are arranged in adjacent relation such that the carriage is movable from one channel segment to another channel segment to control the movement of the carriage so as to move the attached airplane along the driving channel between the locations as may be desired for the current circumstances of the airplane.

The exemplary driving channel 1 is built on the airport apron 4 by digging out a suitable trench in the ground for each subsequent channel segment 5. Such segments may be, according to the particular need, a straight segment 6, a crossing segment at a point where different lengths of the driving channel 1 are crossed, a bifurcating segment at a point where a possibility to select the further course of the driving channel 1 is intended, and turning segments 9 for which a varied curvature of the turn may be provided. Of course different configurations for channel segments are possible depending on the needs and configuration of the particular driving channel through which aircraft are moved to desired locations.

In the trench dug out in the airport apron 4 a channel segment is located in a manner so that the top or upper surface 30 of the channel segment 5 is generally flush with the surface of the airport apron 4. As can be appreciated, in exemplary arrangements the channel segment includes an upper or top opening 32. In the exemplary arrangement the airport apron 4 extends to the top opening 32 of the channel. The upper opening may be selectively closed by the movable plates 13 that extend in the top opening and are operatively attached to the channel segment. The movable plates are in abutting relation to close the upper opening other than the slot 14 and movable to open the upper opening 32 so as to enable access to the interior area of the channel segment. Normally the movable plates are in a closed position, generally closing the upper opening of the channel segment. In this manner a level surface is obtained that in an exemplary arrangement has a narrow elongated slot 14 only. In the exemplary arrangement an elongated slot is created between the movable plates 13 in their closed position. Rollers may be included on the surfaces of the plates, bounding the slot to facilitate movement of an actuator structure therein. The slot 14 formed by the top plates of the channel segment 5 does not impede the use of the airport apron 4 with the driving channel 1 when compared to an airport apron 4 without such a channel. With the exemplary system the airport apron 4 may be also used in the same way as it was used before the driving channel was installed. No problems are encountered when moving other vehicles on the airport apron 4 on or adjacent to the movable plates in the closed position.

As shown, in an exemplary arrangement illustrated in FIG. 4, FIG. 5, FIG. 6, FIG. 7, FIG. 8 and FIG. 11, each channel segment 5, either a straight one 6, a crossing one 7, a turning one 9 or a bifurcating one, is provided with at least one driving unit 10 that enables movement of the transporting carriage 2 inside and in guided relation with the interior of the channel segment 5. In some exemplary arrangements, each channel segment 5 may be independent relative to other channel segments 5 with regard to movement of the transporting carriage 2. The guiding structures such as guide rails and wheels like those mentioned in the incorporated disclosure may be included in the interior of each channel segment. Such structures may be included in aligned relation in adjacent channel segments so as to form a continuous guiding structure that extends along the channel direction. As a result, the carriage is movable from one channel segment to another in guided relation in the interior of each respective channel segment.

Exemplary channel segments 5 of this arrangement may comprise more than one driving unit 10. For crossing segments 7 or bifurcating segments multiple driving units may be necessary, while generally for straight segments and turning segments, more than one driving unit is not necessary.

Each exemplary driving unit 10 comprises a motor 11 in operative connection with at least one transmission gear 12. In the exemplary arrangements shown in the drawings, in driving units 10 a motor 11 is used which may include an electric motor. In other exemplary arrangements a motor 11 may be used which is a pneumatic motor, combustion motor or a hydraulic motor. In other exemplary arrangements, the motor may include a magnetic driving unit.

Exemplary transmission gears 12 may include for example one or more moving members such as belts. Such transmission gears may also or alternatively include a toothed gear, such as one or more cog gears or cog belts. Exemplary transmission gears may also include friction gears such as one or more friction rollers. Exemplary transmission gears may also include tension gears such as cables, wire ropes or chains. Further exemplary transmission gears may include for example, a shaft gear, such as a worm gear arrangement, that moves a body or similar structure responsive to rotation thereof. In other exemplary arrangements, the transmission gear may include one or more magnets which are operable to be moved via the magnetic drive so as to impart movement to the carriage.

Further it should be appreciated that in some exemplary arrangements channel segments may include multiple types of transmission gears, each of which may operatively engage the carriage so as to selectively move the carriage in and through the respective channel segment. Of course it should be understood that these transmission gear types are exemplary and in other arrangements, other types of transmission gears and motion imparting structures may be utilized for purposes of moving the carriage.

In an exemplary arrangement devices that are operative to move the carriage and which comprise the transmission gears extend within the channel segments. In some exemplary arrangements, the transmission gear structures 12 such as belts, magnets, rollers, cables and other structures extend laterally between the guide rails which guide the movement of the carriage within the channel segments. For example in some arrangements, belts, cables, chains, rollers or similar structures (which are schematically represented) may be movable between the guide rails and in operative connection with the carriage so as to move the carriage in the desired manner through the channel segments. Alternatively or in addition, other transmission gear structures such as rollers, gears, belts, etc. may extend in connection with the carriage adjacent side wall portions of the channel segment or other areas so as to impart selective movement thereto. Further in some exemplary arrangements, magnets or other suitable structures may be movable within the channel segment so as to move magnetic components of the carriage selectively as desired. Of course it should be understood that these transmission gear structures are exemplary and in other arrangements, other types of movement imparting structures and devices may be utilized.

As shown in FIG. 4, FIG. 5, FIG. 6, FIG. 7, FIG. 8 and FIG. 11, an exemplary driving unit 10 is located in this exemplary arrangement in side cavities of the channel segments 5. In this configuration the driving unit does not obstruct the movement of the transporting carriage 2 inside the channel segment 5 of the driving channel 1.

In some exemplary arrangements not all of the channel segments 5 may be provided with their own driving units 10. In some cases the driving movement may be transmitted from a channel segment 5 provided with a driving unit 10 to a transmission gear or other carriage moving structures in another channel segment 5 which does not have its own driving unit 10. This may be done, for example, by having gears, shafts, rollers or other driving structures on one channel segment that includes its own driving unit, engaging driven structures on an adjacent channel segment so as to provide moving force to the transmission gear structures of the type utilized thereon for purposes of selectively moving the driving carriage. Numerous different approaches may be taken for providing power transmission from one channel segment to another.

By providing suitably aligned and adjacent channel segments, including driving units and suitable transmission gears, the transporting carriage 2 of this exemplar arrangement may be precisely and reliably guided in the driving channel 1.

As can be appreciated in exemplary arrangements a control system may be operative to selectively position the carriage within a selected segment of the driving channel so that the basket thereof underlies or is positioned adjacent to the at least one front wheel of the aircraft. In exemplary arrangements, the basket or similar structure which operatively engages the at least one front wheel or landing gear structure may be selectively operative to include movable portions such as a movable bottom portion that can be aligned through operation of one or more actuators associated with the carriage generally at the same level as the top flush portion of the plates of the channel segment. In some exemplary arrangements the one or more vertically extending actuators may be operative to initially position the basket such that it is partially retracted into the upper opening of the channel segment through an open portion created by the movement of adjacent plates to an open position. Thereafter the basket may be moved through operation of the actuator to engage and/or capture the at least one wheel in engagement with the basket. In some exemplary arrangements this may be done through vertical movement of the basket structure including the basket side plates, basket side rails and the central wheel supporting portion relative to the carriage so as to elevate the at least one wheel of the airplane slightly above the level of the apron. Further in other alternative arrangements, the basket may have components or other structures that are movable so as to operatively engage the airplane by engagement of the wheel and/or landing gear associated therewith.

Likewise when an airplane has reached a parking location through controlled movement of the carriage, the airplane may be disengaged from the basket. This may be done generally through a manner by which the movable plates are operated to open a portion of the upper opening of the channel segment. The one or more actuators associated with the carriage may be operated to retract downward the basket structures at least partially into the upper opening of the channel segment. Also in some exemplary arrangements a floor portion or other component of the basket may be moved so as to position the at least one front wheel of the aircraft at the same level as the closed plates such that the airplane may be otherwise moved therefrom by a tug or other unit, or alternatively the basket may be held in position until such time as the basket in operative connection with the carriage is utilized to reengage and again move the airplane. Of course it should be understood that these approaches are exemplary and in other arrangements, other approaches may be used.

The exemplary airport apron 4 may be provided with several driving channels 1 of the type described in which a plurality of transporting carriages 2 may be selectively moved to transport airplanes 3 from a parking location to adjacent a take-off location and/or from adjacent a landing location to a parking location.

A system of driving channels 1 for a carriage 2 that transports airplanes 3 on an airport apron 4 allows for fully automatically activating and stopping the individual motors 11 and transmission gears 12 associated with driving units 10 in channel segments 5 included in driving channels 1. Exemplary arrangements of a central computer-based control system or multiple distributed control systems may be operative to control the operation of the carriage units and movement of associated aircraft engaged therewith for purposes of monitoring the status and position of a plurality of aircraft located on the airport apron. For example in exemplary arrangements wireless transceivers may be utilized in connection with the airplanes and the carriages for purposes of identifying the locations of each such airplane which is subject to movement or which has been moved to a parking location by an associated carriage. Further in exemplary arrangements, planned traffic movements may be calculated through operation of the control system so as to assure that airplanes are efficiently and safely moved and parked at desired locations for purposes of carrying out the necessary activities.

In exemplary arrangements while the automated control system may operate to automatically move the carriage structures in transporting and positioning airplanes, the exemplary control system may also include a user interface that is capable of enabling ground personnel at the airport to monitor and review current and future actions to be carried out by the automated system. Such systems may provide for manual override or other suitable functions so as to assure that airport monitoring personnel may avoid any issues that might arise particularly with aircraft or other vehicles on the airport apron that are not subject to control by the automated system. Further in exemplary arrangements, a pilot of an airplane that is being transported through the use of the system may also have the capability to provide inputs so as to enable a manual override or other action as may be necessary. This may include for example being able to engage an emergency stop of a carriage or disengagement of the airplane from the carriage so as to avoid a collision with another vehicle or other undesirable conditions. Of course these features are exemplary and in other arrangements, other approaches may be used.

It is clear that a person skilled in the art is able from the foregoing description, to modify and utilize in different ways the system of driving channels 1 for a carriage 2 for transporting airplanes 3 on the airport apron 4 and the individual elements or assemblies thereof as presented in the non-limiting example, without departing from the contents of the patent claims.

FIGS. 12 through 24 show an alternative exemplary arrangement of a system 34 that is operative to selectively move aircraft on an airport apron. The exemplary alternative system 34 includes features similar to the previously described arrangement except as otherwise indicated.

The exemplary system 34 includes an elongated driving channel 36 that extends along a channel direction in which aircraft 38 are moved to achieve engagement of at least one front wheel 40 of the aircraft for movement by the system. As later discussed in detail the elongated driving channel includes a top opening in which top plates 42 are positioned. The top plates bound a continuous elongated slot 44 that extends along the channel direction. A self-propelled carriage 46 is positioned within the driving channel 36 below the level of the airport apron 50. A basket 48 that is configured to engage and disengage from the at least one front wheel 40 of aircraft is movable in supported connection with the airport apron 50 through a plurality of first side wheels 52 and second side wheels 54 that extend on opposed transverse sides of the driving channel 36. The exemplary basket is in operative connection with the carriage 46 through at least one vertically extending connector 56. As later discussed in detail, the exemplary basket 48 includes selectively movable portions and actuators that enable the basket to engage with and disengage from the at least one front wheel of the aircraft that are moved on the airport apron 50 through operation of the system.

Figure 18:
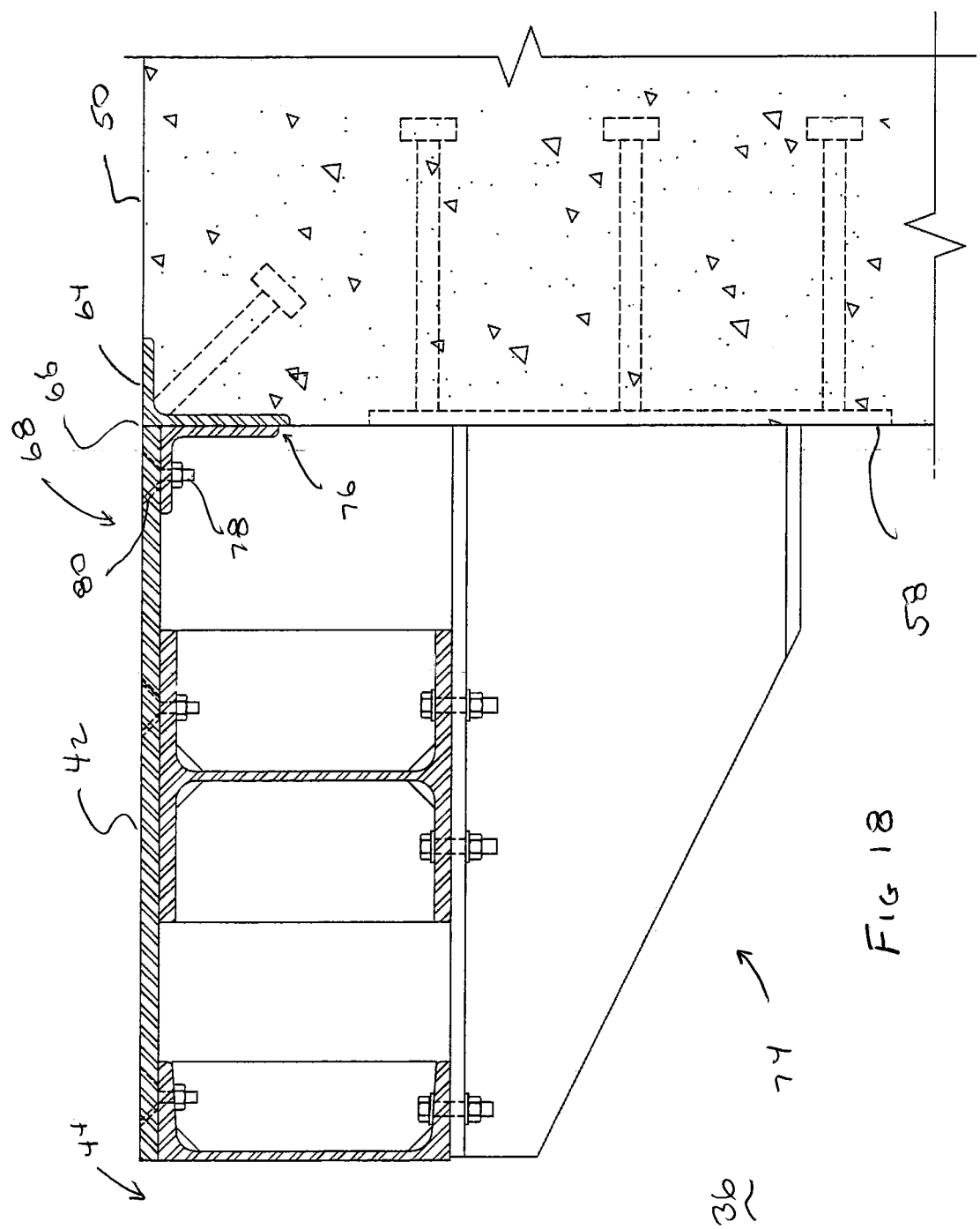
FIG. 18 is a cross-sectional view of at least one exemplary removable plate that extends in the top opening of the driving channel on one transverse side.

As shown in FIGS. 15, 16 and 18 the exemplary elongated driving channel 36 includes in cross-section a rectangular body that is bounded by a pair of vertically extending side walls 58, 60 and generally horizontally extending bottom surface 62. The side walls generally extend upwardly and are positioned adjacent to elongated brackets 64 that bound an upper surface 66 of the driving channel. The exemplary brackets 66 bound a top opening 68 of the driving channel 36. In the exemplary arrangement the top opening 68 and the upper surface 66 are generally flush with the airport apron, which in this disclosure refers to within three inches vertically above being flush with the level of the surrounding airport apron. As can be appreciated in some exemplary arrangements the upper surface 66 of the driving channel may be flush with the level of the surrounding airport apron, while in other arrangements the upper surface 66 and the top opening 68 of the driving channel and an area adjacent thereto may be slightly higher than the surrounding airport apron for purposes of providing drainage away from the driving channel. Of course these approaches are exemplary and in other arrangements other approaches may be used.

In the exemplary arrangement at least one drain pipe 70 extends below the bottom surface 62 of the driving channel. Drain openings 72 are positioned along the bottom side surfaces of the driving channel and are in fluid connection with the at least one drain pipe 70. This enables water or other liquid materials that may collect within the driving channel to be drained therefrom through the at least one drain pipe. Further in some exemplary arrangements this approach enables the interior of the driving channel to be periodically cleaned. This can be accomplished in some arrangements by removing the top plates 42 and flushing the channel with a suitable cleaning material such as water or a detergent material. Alternatively a carriage that is connected to a movable holding tank through the elongated slot 44 may be connected to suitable spray nozzles or other cleaning devices on a carriage so as to periodically clean the driving channel by moving the carriage therethrough. Of course these approaches are exemplary and other arrangements other approaches may be used.

As shown in FIG. 18, the exemplary top plates 42 are each part of a plate supporting assembly 74. The top plates 42 extend transverse to the channel direction on transverse sides within the top opening of the driving channel. In the exemplary arrangement the top plates and the associated plate supporting assemblies are positioned in adjacent abutting relation with one another along the channel direction. The plate supporting assemblies are configured so that the plates 42 in the operative position bound the slot 44 and extend in overlying relation of the carriage 46 as the carriage moves within the driving channel. In some arrangements brush or rubber lip seals may be attached to the plate assemblies to close the slot 44 when vertically extending connectors are not positioned in the immediately adjacent area of the slot. In the exemplary arrangement each of the plate supporting assemblies 74 is configured to be removable from engagement with the driving channel. This is accomplished in the exemplary arrangement by brackets 76 which are in welded or otherwise in fixed connection with brackets 64. The exemplary brackets 76 include openings configured to accept releasable fasteners 78. The releasable fasteners 78 extend through corresponding openings 80 in the top plates 42. As can be appreciated the fasteners 78 in the operative position hold the top plates in fixed relation with the driving channel 36. Removal of the fasteners 78 enables the top plates 42 and the plate supporting assemblies 74 to be removed from the driving channel. This may be done when it is necessary to carry out repairs to the driving channel or to access the carriage. Removal of the plate supporting assemblies 74 may also be done for inspection or cleaning purposes as previously discussed. Of course these approaches are exemplary and in other arrangements other approaches may be used.

In the exemplary arrangement the carriage 46 includes carriage wheels 82. The exemplary carriage wheels support the carriage on the bottom surface 62 so that the carriage may move in supported connection with the bottom surface of the channel. The exemplary bottom surface of the channel has in fixed connection therewith an elongated rail 84. As shown in FIG. 16 the exemplary elongated rail extends along the channel direction and is anchored in fixed connection with the bottom surface 62 of the driving channel. In the exemplary arrangement the elongated rail 84 extends upwardly and terminates at a free upward end 86. The rail further includes a pair of opposed side surfaces 88, 90 that extend along the channel direction. Each of the side surfaces in the exemplary arrangement include in cross-section tapered portions 92. In the exemplary arrangement the opposed outward extending tapered portions 92 form a generally diamond-shape in cross-section at the upward end 86 of the rail 84. Of course it should be understood that this configuration is exemplary and in other arrangements other approaches may be used.

In the exemplary arrangement shown the carriage 46 includes pairs of selectively rotatable clamp rollers 94, 96. Each of the clamp rollers of the pair are configured to engage a respective side surface of the side rail. In the exemplary arrangement the clamp rollers 94, 96 are each selectively rotatable about a common axis 98. In the exemplary arrangement the clamp rollers are rotatable about the axis by a driveshaft or similar driving member. Further in the exemplary arrangement at least one of the clamp rollers, 94, 96 is selectively axially movable along the axis 98. As shown in FIG. 16 each of the respective clamp rollers 94, 96 of the pair is tapered so as to have a conforming configuration with the tapered portions 92 of the side surfaces 88, 90 of the rail. Axial movement of the exemplary clamp rollers enables the rollers to engage a rail side in clamped engagement between the pair of rollers on each side, as well as to clamp the upward end 86 of the rail 84 transversely between the pairs of clamp rollers on opposed sides of the rail. In the exemplary arrangement the carriage 46 is enabled to selectively engage the rotatable clamp rollers in clamping engagement with the rail 84. With the clamp rollers engaged with the rail they may be selectively rotated so as to provide firm engagement between the clamp rollers in the rail and enable the carriage to move along the driving channel while pulling the weight of an aircraft. Further in some arrangements the clamp rollers may be in clamped engagement with the rail and held stationary to prevent carriage movement. Of course this approach is exemplary and in other arrangements other approaches may be used.

The exemplary carriage 46 includes at least one motor 100. In the exemplary arrangement shown the motor 100 comprises an electric motor which is selectively operative to axially position and rotate the clamp rollers to provide selective movement of the carriage. In the exemplary arrangement the electric motor 100 is provided with electric power through electric rails 102,104 that extend along the side walls 58, 60 of the driving channel respectively. As shown in FIG. 17 the exemplary carriage 46 includes movable electrical contacts 106 configured to engage the adjacent electric rail and conduct the electrical power supplied by the adjacent rail to the at least one motor 100. Of course it should be understood that this arrangement is exemplary and in other arrangements the carriage 46 may include other types of motors such as for example a hydrocarbon combustion motor or other type of motor that is suitable for providing power for driving the carriage in the driving channel.

The exemplary basket 48 includes movable portions that are movable between an upward position relative to the carriage and a downward position relative to the carriage similar to the previously described arrangement. For the exemplary basket 48 the movable portions include side plates 106, 108. Each of the side plates is movably mounted in rotatable operative connection with the basket 48. In the exemplary arrangement the side plate 106 is rotatably mounted through hinges 110 and side plate 108 is mounted through hinges 112. A central wheel supporting portion 114 is positioned intermediate of the basket side plates 106, 108 along the channel direction C.

Figure 19:
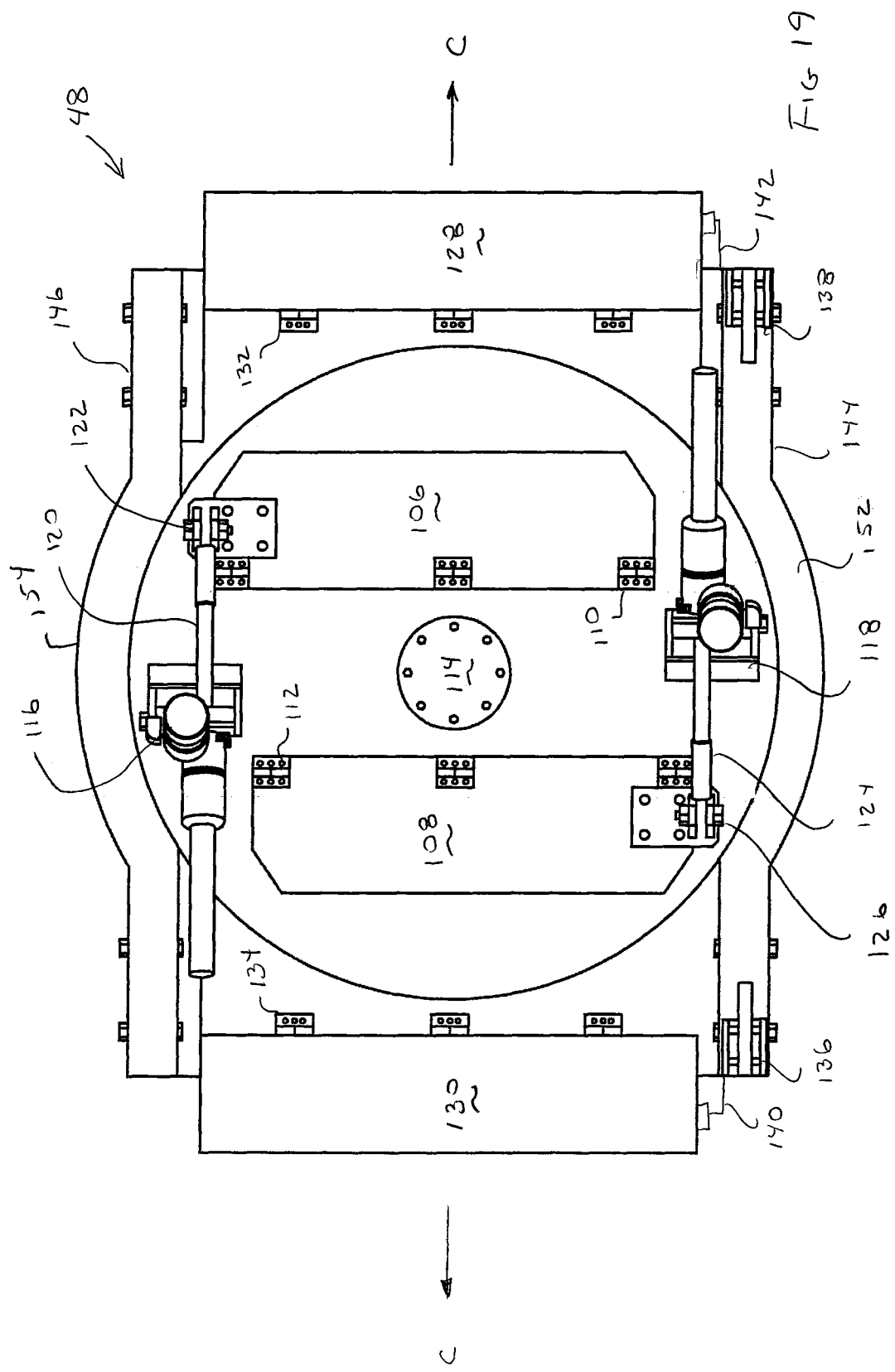
FIG. 19 is a top view of the exemplary basket of the alternative arrangement.
Figure 20:
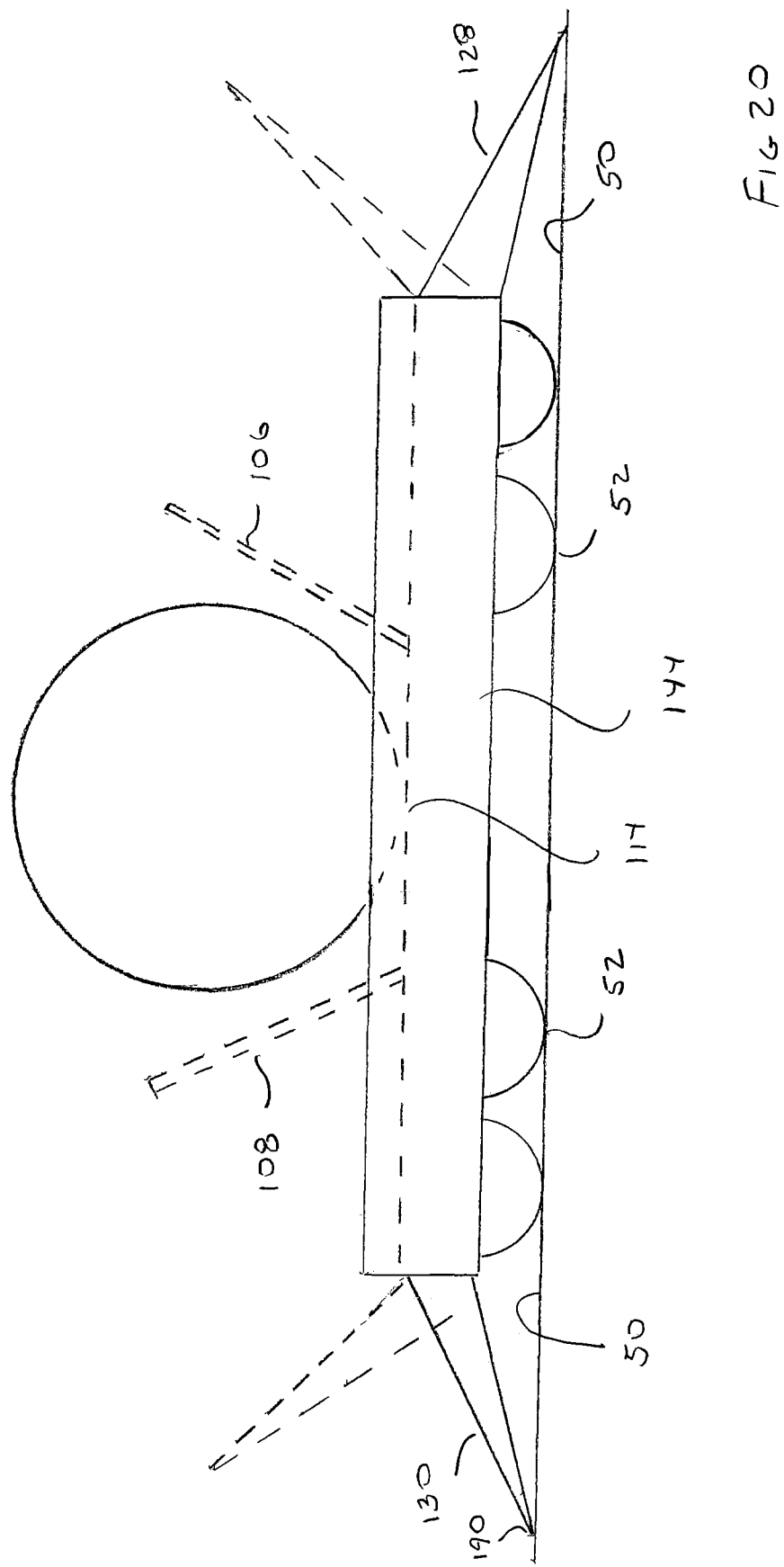
FIG. 20 is a side schematic view of the exemplary basket of the alternative arrangement with the basket side plates shown in phantom in an upward position and the ramps shown in phantom in the ramp up positions.
Figure 21:
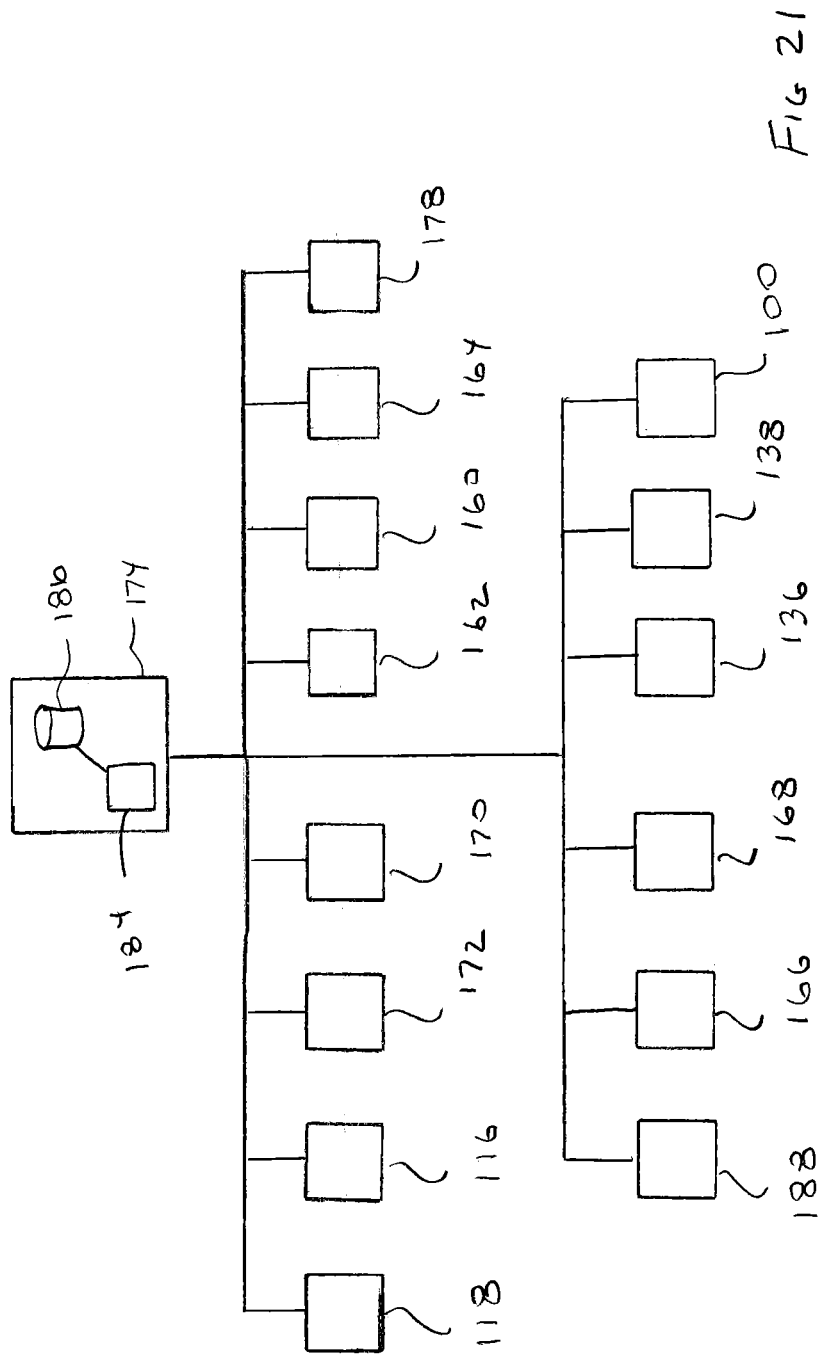
FIG. 21 is a schematic view of exemplary circuitry associated with the carriage and the basket of the alternative arrangement.

In the exemplary arrangement at least one actuator is in operative connection with the basket side plates 106, 108. In the exemplary arrangement the at least one actuator is operative to move the basket side plates 106, 108 between the respective downward positions as shown in FIGS. 14 and 19 and the upward positions as shown in phantom in FIGS. 20, 22 and 24. When in the upward position, the basket side plates extend transversely of the channel direction. In the exemplary arrangement the at least one actuator comprises an actuator 116 which is in operative connection with basket side plate 106 and is operative to move the side plate between the upward position and the downward position. The at least one actuator further includes an actuator 118 which is in operative connection with basket side plate 108 and is operative to move the side plate 108 between the upward and downward positions. In the exemplary arrangement actuator 116 is operative to move side plate 106 responsive to controlled inward and outward movement of an arm 120 of the actuator. The arm 120 is in operative connection with the side plate 106 through a clevis 122. Similarly actuator 118 is operative to move side plate 108 through inward and outward movement of an arm 124 which is connected to the side plate 108 through a clevis 126. In exemplary arrangements the actuators 116, 118 may include electrical actuators that are operative to move the respective arms through a rack or worm gear drive. However in other arrangements other types of actuators such as hydraulic, pneumatic, solenoid or other actuators capable of providing controlled movement of the side plates may be utilized. Further it should be appreciated that in some arrangements a single actuator connected to suitable linkages, such as cables, links and other connecting members, may be operative to move both basket side plates between the respective upward and downward positions. Numerous different approaches may be utilized in connection with different arrangements.

The exemplary basket further includes in movably mounted operative connection therewith a pair of ramps 128, 130. Ramps 128, 130 are positioned at opposed ends of the basket 48 along the channel direction. Ramp 128 is movably mounted in operative connection with the basket through hinges 132. Ramp 130 is movably mounted in operative connection with the basket through hinges 134. In the exemplary arrangement the ramps 128, 130 are movable between respective down ramp positions which are shown in FIGS. 14 and 19 for example, and up ramp positions which are shown in phantom in FIGS. 20 and 22.

In the exemplary arrangement each ramp is in operative connection with the at least one actuator. While in exemplary arrangements a single actuator may be used to achieve movement of both the basket side plates and the ramps, in the exemplary arrangement a respective actuator 136 is in operative connection with ramp 130 and an actuator 138 is in operative connection with ramp 128. In the exemplary arrangement the respective actuators 136, 138 are operative to move the respective ramps 130, 128 through a respective cable 140, 142. Of course it should be understood that this arrangement is exemplary and in other arrangements other approaches may be used.

In the exemplary arrangement the basket 48 includes a pair of side rails 144, 146. The exemplary side rails extend generally parallel to the channel direction on a respective transverse side of the basket. The exemplary side rails extend upwardly above the central wheel supporting portion 114, as well as the basket side plates 106, 108 when the basket side plates are in the downward positions. In the exemplary arrangement the side rails also extend intermediate of and above the upper wheel supporting surfaces of the ramps 128, 130 when the ramps are in the down ramp position. In this exemplary configuration the basket side rails 144, 146 may operate in a manner like the side rails of the previously described arrangements to facilitate holding at least one front wheel of an aircraft in engaged relation with the basket portion on the transverse sides of the basket 48. Further the exemplary side rails at the opposed ends of the basket may serve as guides for moving the at least one front wheel into engagement with the basket 48. Of course this configuration is exemplary and other arrangements other approaches may be used.

In the exemplary arrangements the side rail 144 is configured to extend in overlying relation of the wheels 52 that are positioned on the first transverse side of the basket. The side rail 146 extends in overlying relation of the side wheels 54 on the opposed transverse side of the basket. The side rails extending in overlying relation of the plurality of wheels serves to protect the wheels from engagement with other objects. The configuration also reduces the risk of items moving underneath the basket 48. Of course it should be understood that this configuration is exemplary and in other arrangements other approaches may be used.

The exemplary basket further includes a deck 148. The exemplary deck includes the central basket supporting portion 114. In the exemplary arrangement the basket end plates 106 and 108, and the ramps 128 and 130 are movably mounted in operative connection with the deck 148. The exemplary deck further includes a circular central deck portion 150. In exemplary arrangements the central deck portion 150 may be moveably mounted relative to the basket so as to be rotatable about the center of the central deck portion. This may be done in some arrangements in order to enable the at least one front wheel of the aircraft to be turned while positioned in engagement with the central wheel supporting portion 114. This may be done in some arrangements for purposes of enabling observation and testing of the wheels and landing gear of the aircraft when in turning relation so as to avoid providing lateral stress to the landing gear, or for other purposes. In the exemplary arrangement with the circular central deck portion, the side rails 144,146 include curved central portions 152, 154. This may be done to accommodate the curved character of the central deck portion 152 and facilitate the use of structures that enable the rotation thereof. However it should be understood that in other arrangements the central deck portion 150 may be stationary and may not include a circular configuration.

The exemplary basket 48 further provides the capability of enabling the basket to be disengaged from the carriage and the vertically extending connectors 56 thereof. As represented in FIG. 23, in the exemplary arrangement the basket 48 includes access openings 156, 158. These access openings within the exemplary arrangement are in underlying relation of the removable central deck portion 150 and enable the connections between the vertically extending connectors 56 and the basket 48 to be disconnected. This may be accomplished for example by removing pins or other fasteners that operatively connect the respective vertically extending connectors and the basket 48. By disconnecting the connectors 56 and the basket 48, the basket 48 is enabled to be moved away from overlying relation of the carriage 46. This can be done for example to provide access to the fasteners which hold the top plates 42 in place that overlie the carriage. With the top plates removed the carriage can be accessed in the driving channel 36, or alternatively be lifted up and removed from the driving channel. This capability to disconnect the carriage and the basket may further facilitate the replacement of the vertically extending connectors 56. This may be necessary in some situations where the connectors 56 have a telescoping construction which enables relative vertical movement between the carriage and the basket. The ability to disconnect the basket from the connectors to enable access to the connectors for repair or replacement may facilitate servicing of the system. Of course it should be understood that these approaches are exemplary and in other arrangements other approaches may be used.

In the exemplary arrangement the basket includes one or more sensors in operative connection therewith to facilitate the engagement and disengagement of the at least one front wheel of the aircraft with the basket and to facilitate determining the proper positioning and movement of the at least one front wheel thereon. Numerous different types and arrangements of sensors may be utilized in exemplary arrangements to accomplish these capabilities. For example in some arrangements sensors 160, 162 may be positioned on the side rails 144, 146 at opposed ends thereof along the channel direction. Such sensors may include for example cameras or other image capture devices, lidar sensors, high resolution imaging radar sensors, shortwave infrared sensors for other sensors suitable for sensing features, properties and conditions that are usable to determine if the at least one front wheel of the aircraft is in at least one of alignment and at least one position relative to the basket.

In some arrangements the at least one sensor may also include other types of sensors 164 such as weight sensors and/or photosensors that are positioned in operative connection with the deck 148 of the basket 48. Such sensors 164 may sense properties and provide signals that are usable to determine the position of the at least one front wheel of the aircraft in engagement with the basket, for example. Other sensors utilized in exemplary arrangements may be position sensors 166, 168. Position sensors 168, 166 provide signals indicative of the respective basket side plates 108, 106 in at least one of the upward and downward positions. Position sensors 170, 172 are also in operative connection with the basket 48. Position sensor 170 is operative to sense that ramp 128 in at least one of the down ramp position and the up ramp position. Likewise sensor 172 is operative to sense that ramp 130 is in at least one of the up ramp and the down ramp position. Of course it should be understood that these sensors that are described are exemplary and in other arrangements other sensor types and approaches may be used.

In exemplary arrangements the basket 48 may further include at least one output device 188. The at least one output device may include at least one visual output device such as a light or other indicator. Output devices 188 may further include audio output devices such as a horn or other audibly perceivable indicator. Other output devices in exemplary arrangements may include devices which are operative to output wireless signals such as radio frequency signals or nonvisible radiation signals which provide indications or other information related to the status of the basket and/or the carriage. For example in some arrangements the indicator 188 may provide a visible signal that is indicative to a pilot of the location of the basket onto which they are to engage the at least one front wheel the aircraft. Other indicators may wirelessly indicate to the pilot the location of the basket so that instruments within the cockpit of the aircraft may be utilized to locate the proper basket for engagement with the aircraft. Other exemplary arrangements may include light indicators which indicate that the at least one front wheel is in proper engagement with the central wheel supporting portion of the basket. Other exemplary arrangements may provide audible signals, visual signals or wireless signals indicative of conditions of the basket side plates and/or the ramps. Numerous different output devices which provide different types of signals usable in connection with the exemplary system may be utilized.

In the exemplary arrangement at least one controller 174 is in operative connection with the sensors and the actuators that are associated with the basket 48. In the exemplary arrangement the controller 174 as well as the sensors and other components associated with the basket are supplied with electrical power through an electrical conductor 176 that extends from the carriage 46 and an electrical power supply thereon, upward through the elongated slot 44 to the basket. This enables for example, the power supply on the carriage that is in operative connection with the electric supply rails that extend along the driving channel, and or an electrical generator that is powered by the hydrocarbon combustion motor of the carriage, to provide electricity for the controller, sensors, actuators and other components that are utilized in the exemplary arrangement. Further, it should be pointed out that although in the exemplary arrangement the controller is shown as mounted on the basket 48, in other arrangements the controller 174 may be mounted on the carriage or in other locations.

In exemplary arrangements the at least one controller 174 is in operative connection with a wireless transceiver 178. In exemplary arrangements the wireless transceiver 178 includes at least a portion thereof that extends above the driving channel 36. This facilitates the ability of the wireless transceiver 178 to communicate wireless messages with one or more local or remote devices. In some exemplary arrangements the at least one wireless transceiver may communicate via local wireless messages with a portable wireless device 180 such as a smart phone or tablet computer. In other exemplary arrangements the wireless transceiver may communicate with control panel circuitry 182 located in a cockpit of an aircraft which may be operated by a pilot of the aircraft. Further in some exemplary arrangements the at least one wireless transceiver 178 may communicate via cellular communications or other wide area network communications so as to enable remote control of the basket and the carriage from at least one remote server circuit that communicates messages responsive to inputs from runway ground controllers located remotely in a control tower or other location remote from the aircraft. In some arrangements all such types of wireless communications are carried out. Of course it should be understood that these approaches are exemplary and in other arrangements other approaches may be used.

The exemplary controller 174 includes one or more circuits that are operative to communicate electrical signals with the sensors and the actuators and other system components to control operation of the actuators, the motors driving the carriage, and other components of the exemplary system. In the exemplary arrangement the controller 174 includes at least one circuit including a processor indicated 184 and at least one data store schematically indicated 186. In exemplary arrangements the processor may include a processor suitable for carrying out circuit executable instructions that are stored in the one or more associated data stores. The processor may include or be in operative connection with a nonvolatile storage medium including instructions that include a basic input/output system (BIOS) or other suitable interfaces. For example, the processor may correspond to one or more or combination of a CPU, FPGA, ASIC or any other integrated circuit or other type of circuit that is capable of processing data and instructions. The at least one data store may correspond to one or more of volatile or nonvolatile memory such as random access memory, flash memory, magnetic memory, optical memory, solid-state memory or other devices and media that are operative to store circuit executable instructions and data. Processor circuit executable instructions may include instructions in any of a plurality of programming languages and formats including, without limitation, routines, subroutines, programs, threads of execution, objects, scripts, methodologies and functions which enable the controller to carry out the actions such as those described herein. Structures for processors and data stores may include, correspond to and utilize the principles described in the textbook entitled Microprocessor Architecture, Programming and Applications with the 8085 by Ramesh S. Gaonker, Sixth Edition (Penram International Publishing 2013) which is incorporated herein by reference in its entirety.

In an exemplary arrangement the basket and carriage arrangement are operative to engage the at least one front wheel of an aircraft, hold the at least one front wheel in engagement with the basket, transport the aircraft through movement of the carriage in the driving channel to the desired location, and disengage the aircraft from the basket at the desired final location. This is accomplished in an exemplary operational scenario by an operator such as an operator of the portable wireless device 180, the pilot operating the control panel 182 in the aircraft, or a remote ground controller operating the actuators to place both of the ramps 128, 130 in the ramp up position. The operator then causes communication of wireless signals that are received through the wireless transceiver 178 and which are operative to cause the controller 174 to cause the carriage to move within the driving channel to a desired location along the driving channel at which the basket will be engaged with the aircraft. It should be understood that in moving the carriage and the basket along the driving channel, the carriage may move through curved portions, straight portions, crossing portions or other portions of the driving channel having various configurations. In some exemplary arrangements the driving channel may also branch through switches to different driving channels into which the carriage may be moved selectively responsive to signals received through the at least one wireless transceiver or responsive to other signals.

Figure 22:
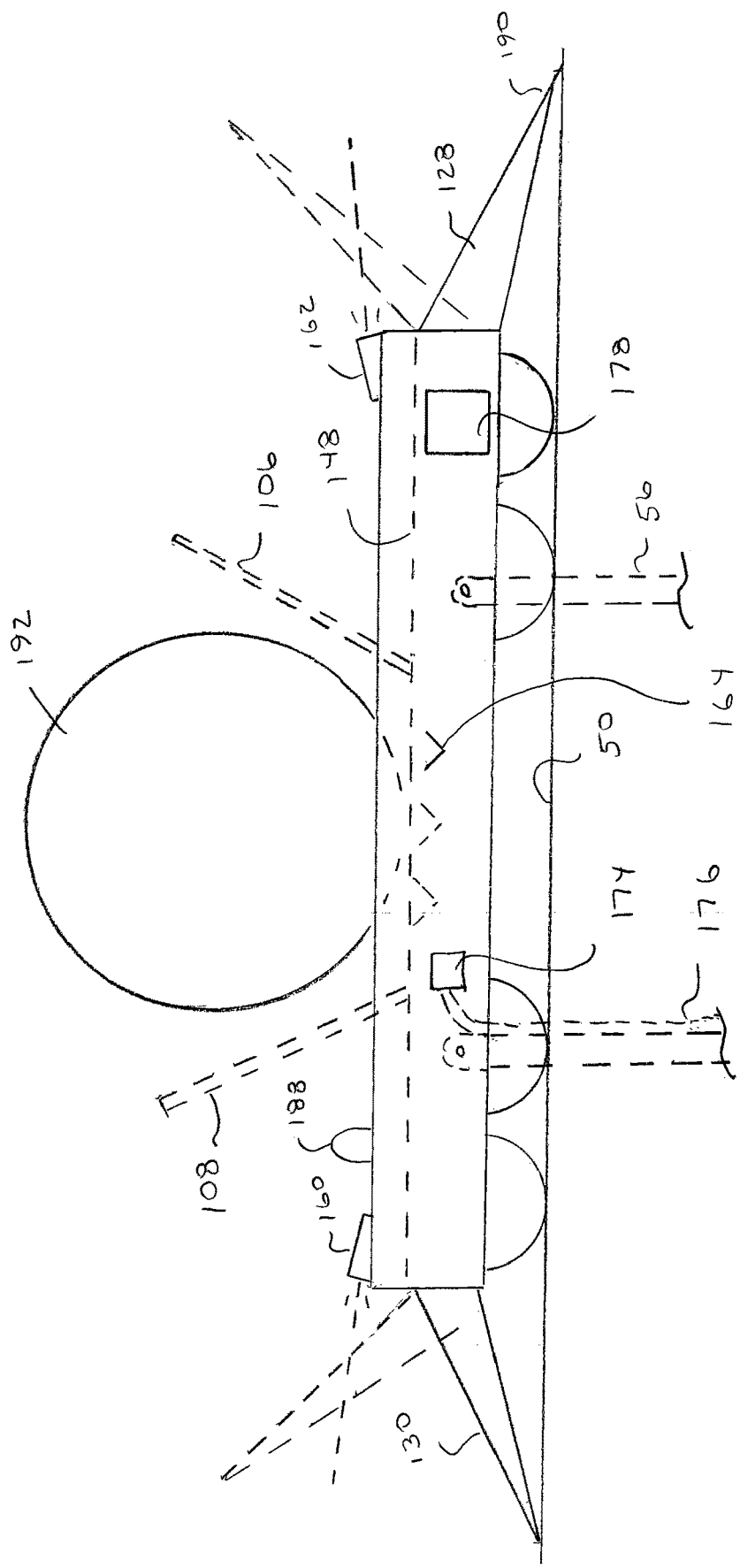
FIG. 22 is a side schematic view of the exemplary basket and exemplary sensors mounted thereon along with a wireless transceiver.

Once the carriage and the basket are in the desired location for engagement with the at least one front wheel of the desired aircraft, the carriage is stopped and the actuators are operated to place at least one ramp such as ramp 128 in the down ramp position. In the down ramp position such as is shown in FIG. 22, a distal end of the ramp 190 which is disposed furthest away from the central wheel supporting portion is positioned generally at the level of the airport apron 50. As used herein when it is indicated that the distal end of the ramp is generally at the level of the airport apron it is meant that the distal end is either in contacting relation with the airport apron 50 or disposed in a location somewhat above the airport apron that can be readily traversed by the at least one front wheel of the aircraft. In the exemplary arrangement the basket side plate 106 is also placed in the downward position when the ramp 128 is in the down ramp position.

In some exemplary arrangements when the aircraft is going to move relative to the basket into engagement therewith, the other basket side plate 108 may be moved to the downward position and the other ramp 130 may also be placed in the down ramp position with the corresponding distal end thereof generally at the level of the airport apron. Alternatively the controller 174 may operate responsive to wireless signals to maintain the basket side plate 108 in the upward position. This may be done for example to provide a stop against which the at least one front wheel schematically indicated 192 may be engaged to stop movement along the channel direction when the wheel has moved into engagement with the central wheel supporting portion 114 of the basket. In some exemplary arrangements when the basket side plate 108 is in the upward position the ramp 130 is maintained in the up ramp position as well. Of course these approaches are exemplary and in other arrangements other approaches may be used.

In exemplary arrangements the at least one sensor may be operated as the aircraft approaches the basket to sense properties that are usable to determine if the at least one front wheel is in at least one of alignment and in at least one position relative to the basket. As previously discussed in exemplary arrangements the aircraft is enabled to move along the channel direction into engagement with the basket. This enables the at least one front wheel and the associated landing gear of the aircraft to be positioned in engagement with the basket in the normal takeoff and landing position. Thus any stresses created by movement of the basket are along the channel direction and are in the direction in which the aircraft landing gear is built to readily resist forces. This is a useful aspect of the exemplary arrangement which avoids causing transverse forces on the landing gear at the front of the aircraft during aircraft movement.

In an exemplary arrangement in which the at least one sensor such as sensor 164, 162 comprises a camera, the at least one camera provides a field of view that includes the upper surface of the channel along the channel direction adjacent to the basket and toward the aircraft. In this exemplary arrangement the controller 174 operates in accordance with its circuit executable instructions to cause a wireless transceiver to wirelessly transmit signals including image data that corresponds to the field of view. In this exemplary arrangement the image data is usable to move the at least one front wheel in alignment along the channel direction and into engagement with the basket 48. In exemplary arrangements the field of view may include images of the approaching at least one front wheel of the aircraft. Further in exemplary arrangements the output images may include superimposed indicators in the images or other indicia that are presented in accordance with the circuit executable instructions, and which are usable to indicate to the pilot operating the control panel 182 or person on the ground operating the portable wireless device 180, and/or remote ground controllers, of the current position and alignment of the at least one front wheel relative to the basket. Such images presenting the field of view may be usable to enable the pilot or an automated system to move the aircraft into generally aligned relation with the channel direction so as to enable the at least one front wheel of the aircraft to properly move into engagement with the basket.

Further in exemplary arrangements the controller 174 may operate responsive to the weight sensors and/or photosensors or other sensor types 164 to provide wireless signals indicative of the position of the at least one front wheel in adjacent and/or engaged relation with the basket. In exemplary arrangements the at least one controller may be operative to determine responsive at least in part to signals from the sensors that the at least one front wheel has reached a position in alignment with the central wheel supporting portion 114. The controller 174 may operate to cause the communication of wireless signals which are indicative of the position of the at least one front wheel as the basket and the wheel 192 undergo relative movement along the channel direction. Further in exemplary arrangements sensors located in operative connection with the basket may be operative to a indicate location of the at least one front wheel transversely relative to the channel direction while adjacent to the basket or when in engagement with the ramp or deck of the basket. Further in exemplary arrangements the controller 174 may operate responsive at least in part to the sensors to cause one or more outputs to be provided from the output device 188 which are indicative of the condition and/or position of the at least one front wheel relative to the basket or other basket components. For example in some arrangements the controller may cause the at least one output device 188 to give a particular type of visual or audible output indicative that the at least one front wheel is in the position in overlying relation of the central wheel supporting portion. Of course it should be understood that these approaches are exemplary.

Further in other exemplary arrangements other types of sensors such as the lidar, high-resolution imaging radar sensors, shortwave infrared sensors or other sensors may be operative to sense the alignment, position and/or movement of the at least one front view of the aircraft. The controller may operate responsive to its circuit executable instructions to cause wireless signals to be communicated indicative of the position and/or movement of the aircraft and/or the at least one front wheel to enable the at least one front wheel to be aligned along the channel direction and moved into a position in engagement with the basket with the at least one front wheel position at the central wheel supporting portion 114. Numerous different approaches may be taken for achieving such accurate positioning and engagement of the basket and the at least one front wheel in various arrangements.

It should be appreciated that in some exemplary arrangements the at least one front wheel of the aircraft may be engaged with the basket 48 by the at least one front wheel moving along the channel direction onto one of the ramps, across one of the basket side plates when in the down position, and onto the central wheel supporting portion. During this movement the carriage may operate to hold the basket stationary. This may include for example the carriage being operated responsive to the controller to cause the clamping rollers to clamp onto the central rail at the bottom of the driving channel and maintain a stationary rotational position so as to hold the carriage in position resisting any forces applied by the aircraft tending to move the carriage and the basket. Alternatively in other arrangements the relative movement of the basket and the at least one front wheel the aircraft may be carried out by maintaining the aircraft in a stationary position and moving the basket through operation of the carriage in the channel direction toward the at least one front wheel of the aircraft. This may be accomplished for example by the brakes on the landing gear the aircraft other than those associated with the at least one front wheel, being engaged to hold the aircraft stationary on the airport apron. In such arrangements the basket may be movable by the carriage along the channel direction so as to come into underlying relation with the at least one front wheel, and move so that the wheel is on the central wheel supporting portion. Of course it should be understood that these approaches are exemplary and other arrangements other approaches may be used.

Once the at least one front wheel of the aircraft is positioned in engagement with the central wheel supporting portion 114 of the basket, the controller 174 may be operated responsive to the stored circuit executable instructions and/or wireless signals received through the transceiver 178 to place the basket in position for movement along the driving channel. In exemplary arrangements the basket side plates 106, 108 are moved responsive to the actuators 116, 118 to the upward positions. This causes the basket side plates to extend upward and transversely relative to the at least one front wheel. This causes the at least one front wheel to be held in engaged relation with the basket 48. In some exemplary arrangements the controller may be operative to cause the output of wireless signals through the wireless transceiver and/or at least one output from the output device 188 to indicate that the at least one front wheel is held engaged with the basket. Further the at least one controller may operate responsive at least in part to wireless signals to cause the ramps 128, 130 to be moved into the ramp up positions. Likewise in some exemplary arrangements the controller may operate to cause output of wireless signals and/or visual and audio outputs to provide indications that the carriage and basket are in position to move the aircraft. Of course these approaches are exemplary and in other arrangements other approaches may be used.

With the at least one front wheel held in engaged relation with the basket 48 by the basket side plates 106, 108 in the upward positions, and both ramps 128, 130 in the up ramp positions, the controller 174 may operate in accordance with its circuit executable instructions to cause the carriage to move in the desired direction in the driving channel responsive to receipt of wireless signals. As previously discussed the wireless signals that cause movement of the carriage may be received from a local source such as the portable wireless device 180 and/or the control panel 182 of the aircraft. Alternatively the wireless signals that cause the carriage to move to a position for engaging the at least one front wheel of the aircraft, and once engaged, to move along the driving channel to an end location may be received from a remote source such as a ground controller located in the control tower or other remote location. Of course these approaches are exemplary and in other arrangements other approaches may be used.

Once the aircraft has been transported through operation of the carriage 46 and the basket 48 to the desired location on the airport apron, the at least one front wheel the aircraft can be disengaged from the basket 48. This is accomplished in exemplary arrangements by at least one of the basket side plates 106, 108 being moved from the upward position to the downward position through operation of the controller 174 responsive to receipt of at least one wireless signal. The controller further operates responsive to receipt of at least one wireless signal to cause one or more of ramps 128, 130 to be moved from the up ramp positions to the down ramp positions. Wireless signals and/or visual or audible outputs may be provided indicative of the basket side plates and or ramps moving to these positions. As previously discussed the distal end 190 of the ramp on which the at least one front wheel of the aircraft will be moved during disengagement from the basket is positioned generally at the level of the airport apron 50 to achieve a smooth disengagement of the ramp and the wheels. As previously discussed in some exemplary arrangements the basket side plate only on the side to which the at least one front wheel will move during disengagement may be moved to the lower position and the ramp on the same side moved to the down ramp position. Alternatively both of the basket side plates and ramps may be moved to the downward positions during wheel disengagement.

Once the appropriate basket side plate and ramp are moved downward the at least one front wheel of the aircraft and the basket undergo relative movement along the channel direction. This causes the at least one front wheel to pass across the deck 148 and on the respective ramp to reach the airport apron 50. As previously discussed in some arrangements the aircraft may move to disengage from the basket while the basket is held stationary by the carriage. Alternatively in some arrangements the aircraft may be held stationary while the carriage and the basket move along the channel direction to disengage from the at least one front wheel.

In exemplary arrangements once the at least one front wheel is clear of the basket the controller is operative to cause the at least one output device 188 to provide at least one output indicative that the basket is clear of the at least one wheel. The exemplary controller may further send wireless messages to the wireless transceiver 178 to indicate the condition of the aircraft and the basket. Thereafter in exemplary arrangements the basket may be operated responsive to its circuit executable instructions and wireless signals to move the ramps 128, 130 to the ramp up positions. The carriage may then operate responsive to wireless signals and/or the programming of the controller which is operative to cause the carriage to move to the carriage in the basket along the driving channel to the desired position at which the next aircraft movement operation will be commenced. Of course it should be understood that these approaches are exemplary and in other arrangements other approaches may be used.

Thus the elements, features and characteristics of the exemplary arrangements described herein achieve desirable results, eliminate difficulties encountered in the use of prior devices and systems, solve problems and attain one or more useful objectives as described herein.

In the foregoing description, certain terms have been used for brevity, clarity and understanding. However, no unnecessary limitations are to be implied therefrom because such terms are used for descriptive purposes and are intended to be broadly construed. Moreover, the descriptions and illustrations given herein are by way of examples and the useful features are not limited to the exact details shown and described.

Further in the description, words that refer to left/right, top/bottom, up/down or similar terms indicating relative locations of items shall not be deemed limiting and it is to be understood that exemplary arrangements can be configured and used in numerous different orientations.

Having described the features, discoveries and principles of the exemplary arrangements, the manner in which they are constructed, operated and utilized, and the advantages and useful results attained, the new and useful structures, devices, elements, arrangements, parts, combinations, systems, equipment, operations, methods, processes and relationships are set forth in the appended claims.

I claim:

1. A system operative to move an aircraft supported on an airport apron, comprising:
   an elongated driving channel, wherein the driving channel
      extends along a channel direction,
      extends below the airport apron,
      has an upper surface that is generally flush with the airport apron,
   a carriage, wherein the carriage
      is positioned below the airport apron in the driving channel,
      is selectively movable along the channel direction within the driving channel,
   a basket, wherein the basket
      is in operative connection with the carriage
      is configured to engage and disengage from at least one front wheel of an aircraft by the at least one front wheel and the basket relatively moving in generally aligned relation with the channel direction,
   at least one actuator, wherein the at least one actuator
      is in operative connection with the basket, is selectively operative to move at least one portion of the basket upward and downward relative to the carriage, wherein movement of the at least one portion from a downward position to an upward position responsive to the at least one actuator is operative to cause the basket to be in a configuration in which at least one front wheel in engagement with the basket and in generally aligned relation with the channel direction is caused to be held engaged with the basket, wherein with the basket in the configuration and with the at least one front wheel held engaged with the basket, the aircraft is movable along the channel direction responsive to movement of the carriage in the channel, and wherein movement of the at least one portion from the upward position to the downward position is operative to cause the basket to be in a further configuration, wherein with the basket in the further configuration the at least one front wheel in engagement with the basket is not held engaged with the basket, and the at least one front wheel is enabled to disengage from the basket by movement of the at least one front wheel along the channel direction relative to the basket.

2. The system according to claim 1
wherein the at least one portion of the basket includes a pair of basket side plates,
wherein each of the basket side plates
is disposed away from the other basket side plate in the channel direction,
in the upward position extends transverse to the channel direction,
is configured to extend on an opposed side of the at least one front wheel from the other basket side plate along the channel direction, whereby the at least one front wheel is held engaged with the basket.

3. The system according to claim 1
wherein the at least one portion of the basket includes a pair of basket side plates,
wherein each of the basket side plates
is disposed away from the other basket side plate in the channel direction,
in the upward position extends transverse to the channel direction,
is configured to extend on an opposed side of the at least one front wheel from the other basket side plate along the channel direction, and
wherein the basket includes a central wheel supporting portion along the channel direction intermediate of the basket side plates.

4. The system according to claim 1
wherein the elongated channel includes a top opening, and further comprising:
a plurality of top plates, wherein the plates extend in adjacent abutting relation on opposed transverse sides of the channel in the top opening and in overlying relation of the carriage,
wherein a continuous elongated slot extends in the channel direction between the top plates,
at least one vertically extending connector, wherein the at least one vertically extending connector extends through the elongated slot and operatively connects the carriage and the basket such that movement of the carriage along the channel direction causes movement of the basket in the channel direction.

5. The system according to claim 1
wherein the at least one portion of the basket includes a pair of basket side plates,
wherein each of the basket side plates
is disposed away from the other basket side plate in the channel direction,
in the upward position extends transverse to the channel direction,
is configured to extend on an opposed side of the at least one front wheel from the other basket side plate along the channel direction,
wherein the basket further includes
a central wheel supporting portion, wherein the central wheel supporting portion extends along the channel direction intermediate of the basket side plates,
a pair of side rails, wherein each side rail extends
parallel to the channel direction,
intermediate of the basket side plates,
upwardly above the central wheel supporting portion, and
on a transverse side of the central wheel supporting portion opposite the other side rail.

6. The system according to claim 1
wherein the elongated channel includes a top opening, and further comprising:
a plurality of removable plates, wherein in an operative position
the plates extend in adjacent abutting relation on opposed transverse sides of the channel in the top opening and in overlying relation of the carriage, and
a continuous elongated slot extends in the channel direction between the plates,
at least one vertically extending connector, wherein the at least one vertically extending connector operatively connects the carriage and the basket and extends through the elongated slot, wherein movement of the carriage along the channel direction causes movement of the basket in the channel direction,
wherein removal of the removable plates enables access to the carriage.

7. The apparatus according to claim 1
wherein the basket includes a plurality of wheels,
wherein at least some of the respective wheels engage the airport apron on transversely opposed sides of the driving channel,
wherein the basket is movable in supported connection with the airport apron through the wheels.

8. The apparatus according to claim 1
wherein the basket includes
at least two first side wheels disposed on a first transverse side of the driving channel, wherein the at least two first side wheels are in engagement with the airport apron and are disposed from one another in a direction parallel to the channel direction,
at least two second side wheels disposed on a second transverse side of the driving channel, wherein the second transverse side is opposed of the first transverse side, wherein the at least two second side wheels are in engagement with the airport apron and are disposed from one another in a direction parallel to the channel direction,
wherein the basket is movable along the channel direction in supported connection with the airport apron through the first side wheels and the second side wheels.

9. The apparatus according to claim 1
wherein the basket includes
at least two first side wheels disposed on a first transverse side of the driving channel, wherein the at least two first side wheels are in engagement with the airport apron and are disposed from one another in a direction parallel to the channel direction,
at least two second side wheels disposed on a second transverse side of the driving channel, wherein the second transverse side is opposed of the first transverse side, wherein the at least two second side wheels are in engagement with the airport apron and are disposed from one another in a direction parallel to the channel direction,
wherein the basket is movable along the channel direction in supported connection with the airport apron through the first side wheels and the second side wheels,
wherein the basket includes a central wheel supporting portion, wherein the central wheel supporting portion is configured to support the at least one front wheel, wherein the central wheel supporting portion extends transversely intermediate of the first side wheels and the second side wheels,
a ramp, wherein the ramp is movably mounted in operative connection with the basket and extends transversely between the first side wheels and the second side wheels,
wherein the ramp is movable between a down ramp position in which a distal end of the ramp disposed further away from the central wheel supporting portion of the basket, is generally at a level of the airport apron, and an up ramp position in which the distal end of the ramp is disposed upward away from the level of the airport apron,
wherein the at least one actuator is selectively operative to move the ramp between the down ramp position and the up ramp position,
wherein the at least one actuator is selectively operative to cause the basket to be in the further configuration and the ramp to be in the ramp down position, whereby the at least one front wheel is enabled to move along the channel direction, onto the ramp and into engagement with the central wheel supporting portion of the basket, and
wherein the least one actuator is selectively operative to cause the basket to be in the configuration and the ramp to be in the up ramp position, wherein the basket is movable along the channel direction responsive to carriage movement with the at least one front wheel held engaged with the basket.

10. The apparatus according to claim 1
wherein the basket includes
at least two first side wheels disposed on a first transverse side of the driving channel, wherein the at least two first side wheels are in engagement with the airport apron and disposed from one another in a direction parallel to the channel direction,
at least two second side wheels disposed on a second transverse side of the driving channel, wherein the second transverse side is opposed of the first transverse side, wherein the at least two second side wheels are in engagement with the airport apron and disposed from one another in a direction parallel to the channel direction,
wherein the basket is movable along the channel direction in supported connection with the airport apron through the first side wheels and the second side wheels,
wherein the basket includes a central wheel supporting portion, wherein the central wheel supporting portion is configured to support the at least one front wheel, wherein the central wheel supporting portion extends transversely intermediate of the first side wheels and the second side wheels,
a first ramp, wherein the first ramp is movably mounted in operative connection with the basket and extends transversely between the first side wheels and the second side wheels at a first end of the basket,
wherein the first ramp is movable between a down first ramp position in which a distal end of the first ramp disposed furthest away from the central wheel supporting portion is generally at a level of the airport apron, and an up first ramp position in which the distal end of the first ramp is disposed upward away from the level of the airport apron,
a second ramp, wherein the second ramp is movably mounted in operative connection with the basket and extends transversely between the first side wheels and the second side wheels at a second end of the basket opposed of the first end along the channel direction,
wherein the second ramp is movable between a down second ramp position in which a distal end of the second ramp disposed furthest away from the central wheel supporting portion is generally at the level of the airport apron, and an up second ramp position in which the distal end of the second ramp is disposed upward away from the level of the airport apron,
wherein the at least one actuator is selectively operative to move the first ramp between the down first ramp position and the up first ramp position and the second ramp between the down second ramp position and the up second ramp position,
wherein the at least one actuator is selectively operative to cause the basket to be in the further configuration and the first ramp in the down first ramp position, whereby the at least one front wheel is enabled to move along the channel direction into engagement with the central wheel supporting portion of the basket, and
wherein the at least one actuator is selectively operative to cause the basket to be in the configuration and the first ramp to be in the up first ramp position and the second ramp to be in the up second ramp position, wherein the basket is movable responsive to movement of the carriage in the channel direction with the at least one front wheel held engaged with the basket,
wherein the at least one actuator is selectively operative to cause the basket to be in the further configuration and the second ramp to be in the down second ramp position, whereby the at least one front wheel is enabled to move along the channel direction on the second ramp and disengage from the basket.

11. The apparatus according to claim 1
wherein the basket includes
at least two first side wheels disposed on a first transverse side of the driving channel, wherein the at least two first side wheels are in engagement with the airport apron and disposed from one another in a direction parallel to the channel direction,
at least two second side wheels disposed on a second transverse side of the driving channel, wherein the second transverse side is opposed of the first transverse side, wherein the at least two second side wheels in engagement with the airport apron and are disposed from one another in a direction parallel to the channel direction, wherein the basket is movable along the channel direction in supported connection with the airport apron through the first side wheels and the second side wheels, wherein the basket includes a central wheel supporting portion, wherein the central wheel supporting portion is configured to support the at least one front wheel, wherein the central wheel supporting portion extends transversely intermediate of the first side wheels and the second side wheels, a first basket side rail, wherein the first basket side rail extends generally parallel to the channel direction and upwardly above and on a first transverse side of the central wheel supporting portion, wherein at least some of the first side wheels extend in underlying relation of the first basket side rail, a second basket side rail, wherein the second basket side rail extends generally parallel to the channel direction and upwardly above and on a second transverse side of the central wheel supporting portion opposed of the first transverse side, wherein at least some of the second side wheels extend in underlying relation of the second basket side rail, wherein the first and second basket side rails are configured so that the at least one front wheel of the aircraft when in generally aligned relation with the channel direction, is positionable in intermediate relation between the first and second basket side rails, a first ramp, wherein the first ramp is movably mounted in operative connection with the basket and extends transversely between the first side wheels and the second side wheels at a first end of the basket along the channel direction, wherein the first ramp is movable between a down first ramp position in which a distal end of the first ramp disposed furthest away from the central wheel supporting portion of the basket is generally at the level of the airport apron, and an up first ramp position in which the distal end of the first ramp is disposed upward away from the level of the airport apron, a second ramp, wherein the second ramp is movably mounted in operative connection with the basket and extends transversely between the first side wheels and the second side wheels at a second end of the basket opposed of the first end along the channel direction, wherein the second ramp is movable between a down second ramp position in which a distal end of the second ramp that is disposed furthest away from the central wheel supporting portion of the basket is generally at the level of the airport apron, and an up second ramp position in which the distal end of the second ramp is disposed upward away from the level of the airport apron, wherein the at least one actuator is selectively operative to move the first ramp between the down first ramp position and the up first ramp position and the second ramp between the down second ramp position and the up second ramp position, wherein the at least one actuator is selectively operative to cause the basket to be in the further configuration and the first ramp to be in the down first ramp position, whereby the at least one front wheel is enabled to move along the channel direction into engagement with the central wheel supporting portion of the basket and intermediate of first and second basket side rails, and wherein the at least one actuator is selectively operative to cause the basket to be in the configuration and the first ramp to be in the up first ramp position and the second ramp to be in the up second ramp position, wherein the basket is movable responsive to movement of the carriage in the channel direction with the at least one front wheel held engaged with the basket, wherein the at least one actuator is selectively operative to cause the basket to be in the further configuration and the second ramp to be in the down second ramp position, whereby the at least one front wheel is enabled to move along the channel direction on the second ramp to disengage from the basket.

12. The apparatus according to claim 1
wherein the basket includes
at least two first side wheels disposed on a first transverse side of the driving channel, wherein the at least two first side wheels are in engagement with the airport apron and disposed from one another in a direction parallel to the channel direction, at least two second side wheels disposed on a second transverse side of the driving channel, wherein the second transverse side is opposed of the first transverse side, wherein the at least two second side wheels are in engagement with the airport apron and disposed from one another in a direction parallel to the channel direction, wherein the basket is movable along the channel direction in supported connection with the airport apron through the first side wheels and the second side wheels, wherein the basket includes a central wheel supporting portion, wherein the central wheel supporting portion is configured to support the at least one front wheel of the aircraft, wherein the central wheel supporting portion extends transversely intermediate of the first side wheels and the second side wheels, a first basket side rail, wherein the first basket side rail extends generally parallel to the channel direction and upwardly above and on a first transverse side of the central wheel supporting portion, wherein at least some of the first side wheels extend in underlying relation of the first basket side rail, a second basket side rail, wherein the second basket side rail extends generally parallel to the channel direction and upwardly above and on a second transverse side of the central wheel supporting portion opposed of the first transverse side, wherein at least some of the second side wheels extend in underlying relation of the second basket side rail, wherein the first and second basket side rails are configured so that the at least one front wheel of the aircraft when in generally aligned relation with the channel direction, is positionable in intermediate relation between the first and second basket side rails.

13. The apparatus according to claim 1
wherein the driving channel includes a bottom surface, wherein the bottom surface bounds a bottom of the driving channel,
wherein the carriage includes a plurality of carriage wheels,
wherein the carriage moves in supported connection with the bottom surface through the carriage wheels.

14. The apparatus according to claim 1
wherein the carriage includes at least one motor, wherein the at least one motor is operative to selectively move the carriage along the channel direction in the driving channel,
wherein the at least one motor includes at least one electric motor or hydrocarbon combustion motor.

15. The apparatus according to claim 1
and further comprising:
at least one wireless transceiver,
wherein the carriage is in operative connection with the at least one wireless transceiver,
wherein the carriage is operative to move along the channel direction responsive at least in part to wireless signals received through the at least one wireless transceiver.

16. The apparatus according to claim 1
and further comprising:
at least one camera, and
at least one wireless transceiver,
wherein the at least one wireless transceiver is in operative connection with the at least one camera,
wherein the at least one camera has at least one field of view that includes the upper surface of the channel along the channel direction adjacent to the basket,
wherein the at least one wireless transceiver is operative to wirelessly transmit signals including image data corresponding to the at least one field of view, wherein the image data is usable to move the at least one front wheel into engagement with the basket.

17. The apparatus according to claim 1
and further comprising:
at least one sensor, wherein the at least one sensor is operative to sense that the at least one portion is in at least one of the downward position or the upward position,
at least one wireless transceiver, wherein the at least one wireless transceiver is in operative connection with the at least one sensor and the at least one actuator,
wherein the at least one actuator is operative to cause the at least one portion to move between the upward position and the downward position responsive at least in part to wireless command signals received through the at least one wireless transceiver, and
wherein the at least one wireless transceiver is operative responsive at least in part to the at least one sensor to cause wireless condition signals to be transmitted indicative that the at least one portion is in at least one of the upward position and the downward position.

18. The apparatus according to claim 1
and further comprising:
at least one sensor,
at least one wireless transceiver, wherein the at least one wireless transceiver is in operative connection with the at least one sensor,
wherein the at least one sensor is operative to sense properties usable to determine alignment of the at least one front wheel of the aircraft with the basket,
wherein the at least one wireless transceiver is operative responsive at least in part to the at least one sensor to transmit wireless signals usable to determine alignment.

19. The apparatus according to claim 1
and further comprising:
at least one sensor,
wherein the at least one sensor comprises at least one of a high resolution imaging radar sensor, a shortwave infrared sensor and a lidar sensor,
at least one wireless transceiver, wherein the at least one wireless transceiver is in operative connection with the at least one sensor,
wherein the at least one sensor is operative to sense properties usable to determine at least one of alignment and a position of the at least one front wheel relative to the basket,
wherein the at least one wireless transceiver is operative responsive at least in part to the at least one sensor to transmit wireless signals usable to determine at least one of the alignment and the position of the at least one front wheel relative to the basket.

20. The system according to claim 1
wherein the elongated channel includes a top opening,
a plurality of plates, wherein the plates extend in adjacent abutting relation on opposed transverse sides of the channel in the top opening and in overlying relation of the carriage,
wherein a continuous elongated slot extends in the channel direction between the plates,
at least one vertically extending connector, wherein the at least one vertically extending connector extends through the elongated slot and operatively connects the carriage and
the basket such that movement of the carriage along the channel direction causes movement of the basket in the channel direction,
and further comprising:
at least one sensor, wherein the at least one sensor is in operative connection with the basket,
wherein the at least one sensor comprises at least one of a camera, a high resolution imaging radar sensor, a shortwave infrared sensor and a lidar sensor,
at least one wireless transceiver, wherein the at least one wireless transceiver
is in operative connection with the at least one sensor, and
includes at least a portion that extends above the channel,
wherein at least one of the at least one sensor and the at least one wireless transceiver receive electrical power through at least one electrical conductor that extends from the carriage and upward through the slot,
wherein the at least one sensor is operative to sense properties usable to determine at least one of alignment and a position of the at least one front wheel relative to the basket,
wherein the at least one wireless transceiver is operative responsive at least in part to the at least one sensor to transmit wireless signals usable to determine at least one of the alignment and the position of the at least one front wheel relative to the basket.

21. The apparatus according to claim 1
wherein the driving channel includes a bottom surface, wherein the bottom surface bounds the bottom of the driving channel,
and further comprising:
a drain pipe, wherein the drain pipe extends vertically below the bottom surface,
wherein the bottom surface includes at least one drain opening, wherein the drain opening is in fluid connection with the drain pipe,
wherein water in the driving channel is enabled to drain through the at least one drain opening into the drain pipe.

22. The apparatus according to claim 1
wherein the carriage is operative to move the basket along the channel direction into engagement with the at least one front wheel while the aircraft remains stationary.

23. The apparatus according to claim 1
and further comprising:
an elongated rail, wherein the rail is in fixed operative engagement with the driving channel, includes a pair of opposed rail sides that each extend along the channel direction within the driving channel, and terminates within the driving channel at a free rail end,
wherein the carriage includes at least one selectively rotatable clamp roller, wherein the at least one clamp roller is configured to engage at least one rail side of the rail in clamped engagement,
wherein the carriage is movable through engagement of the at least one rotatable clamp roller and the at least one rail side of the rail.

24. A system operative to move an aircraft supported on an airport apron, comprising:
an elongated driving channel, wherein the driving channel
extends along a channel direction,
extends below the airport apron,
has an upper surface that is generally flush with a level of the airport apron,
a carriage, wherein the carriage
is positioned below the airport apron in the driving channel,
is selectively movable along the channel direction within the driving channel,
a basket, wherein the basket
is in operative connection with the carriage,
is configured to engage and disengage from at least one front wheel of an aircraft by the least one front wheel and the basket relatively moving in generally aligned relation with the channel direction,
includes at least one side plate movably mounted in operative connection with the basket, wherein the at least one side plate extends transversely of the channel direction and is movable between an upward position and a downward position,
includes at least one ramp movably mounted in operative connection with the basket, wherein each at least one ramp extends along the channel direction and is movable between a down ramp position and in up ramp position,
wherein in the down ramp position a distal end of the ramp is generally at a level of the airport apron and in the up ramp position the distal end of the ramp is above the level of the airport apron,
at least one actuator, wherein the at least one actuator
is in operative connection with the at least one side plate and the at least one ramp,
is selectively operative to selectively move at least one side plate between the upward position and the downward position and the at least one ramp between the up ramp position and the down ramp position,
wherein when the at least one ramp is in the down ramp position, relative movement of the basket and the at least one front wheel enables the at least one front wheel to move on the ramp into engagement with the basket,
wherein when the at least one front wheel is in engagement with the basket, movement of the at least one basket side plate from the downward position to the upward position responsive to the at least one actuator is operative to hold the at least one front wheel in engagement with the basket, and
wherein with the at least one front wheel held in engagement with the basket by the at least one basket side plate and with the at least one ramp in the up ramp position responsive to the at least one actuator, the basket is operative to move the aircraft along the channel direction responsive to movement of the carriage in the channel.

* * * * *